(12) United States Patent
Arseneau

(10) Patent No.: US 10,954,851 B2
(45) Date of Patent: Mar. 23, 2021

(54) BALANCED ROTARY ENGINE

(71) Applicant: Michel Arseneau, Saint Hermenegilde (CA)

(72) Inventor: Michel Arseneau, Saint Hermenegilde (CA)

( * ) Notice: Subject to any disclaimer, the term of this patent is extended or adjusted under 35 U.S.C. 154(b) by 0 days.

(21) Appl. No.: 16/412,344

(22) Filed: May 14, 2019

(65) Prior Publication Data

US 2019/0376448 A1    Dec. 12, 2019

Related U.S. Application Data

(63) Continuation of application No. 15/331,395, filed on Oct. 21, 2016, now abandoned.

(51) Int. Cl.
| | |
|---|---|
| *F02B 75/26* | (2006.01) |
| *F01B 3/00* | (2006.01) |
| *F02B 75/06* | (2006.01) |
| *F01B 9/02* | (2006.01) |
| *F02B 75/32* | (2006.01) |
| *F02B 75/16* | (2006.01) |
| *F16F 15/24* | (2006.01) |

(52) U.S. Cl.
CPC ............ *F02B 75/26* (2013.01); *F01B 3/0023* (2013.01); *F01B 9/02* (2013.01); *F02B 75/065* (2013.01); *F02B 75/16* (2013.01); *F02B 75/32* (2013.01); *F16F 15/24* (2013.01)

(58) Field of Classification Search
CPC ........ F02B 75/26; F02B 75/065; F02B 75/32; F02B 75/16; F01B 3/0023; F01B 9/02; F16F 15/24
See application file for complete search history.

(56) References Cited

U.S. PATENT DOCUMENTS

| | | | |
|---|---|---|---|
| 6,357,397 B1 | 3/2002 | Kull | |
| 2004/0107923 A1 | 6/2004 | Lawes | |
| 2006/0283407 A1 | 12/2006 | Mann | |
| 2010/0108034 A1* | 5/2010 | Arseneau | .................. F01B 1/01 |
| | | | 123/45 A |
| 2014/0223896 A1* | 8/2014 | Zhou | ...................... F01B 17/02 |
| | | | 60/370 |

FOREIGN PATENT DOCUMENTS

| | | | | |
|---|---|---|---|---|
| CN | 101220764 A | 7/2008 | | |
| GB | 1193993 A | 6/1970 | | |
| GB | 1193993 A | * 6/1970 | ............. F02B 75/24 |

* cited by examiner

*Primary Examiner* — Audrey K Bradley
*Assistant Examiner* — Edward Bushard
(74) *Attorney, Agent, or Firm* — Benoit & Côté Inc.

(57) ABSTRACT

A balanced rotary engine for applying torque to a drive shaft. The engine has an outer casing with a main drive case. A cylinder is rotably mounted in the casing and a piston is mounted to move longitudinally within the cylinder. Two connecting arms, each with a connecting end, one of the ends is connected to the piston, and two crankshafts, each one being rotably connected to the other connecting end of the connecting arms. Two drive wheels are contra-rotably connected to the respective first and second crankshafts. A fixed drive ring has a circumferentially disposed drive member surface. The fixed drive ring is mounted in the case so that the drive member surface faces the piston. The two drive wheels mesh with the drive ring.

20 Claims, 48 Drawing Sheets

BALANCED ROTARY ENGINE

TECHNICAL FIELD

The present relates to internal combustion engines, and more particularly to a balanced rotary engine.

BACKGROUND

Internal combustion engines with one or more cylinders are well known and widely used in many industries, in particular the automobile industry. Generally speaking, each of the cylinders includes a piston with a spark, or compression, that combusts a hydrocarbon fuel causing explosive power sufficient to reciprocally drive the piston in the cylinder. The power generated by this driven piston can drive a shaft, which when used in traction moves an object, such as a motor vehicle, forwards or rearwards. Also, the power generated can be used statically to move parts in machinery, or can it can generate more power, for example through the use of a generator.

In some cases, this simple mode of operation has been modified such as for example, in the so-called the Wankel engine, which uses one or more specially shaped rotors mounted on a drive shaft. Fuel is combusted to provide the motive power to turn the rotor(s) to drive the drive shaft. During World War One, a so-called rotary engine was introduced and used in a number of aircraft. The rotary engine included a piston casing, which drove a propeller, rather than a crankshaft. Since the first examples of the rotary engine, other rotary engines have been tested in motorcycles and in early road vehicles. However, the principal surviving type of rotary engine is still the Wankel engine, a version of which remains commercially available in some Mazda™ cars.

The principal advantages of rotary engines are an enhanced power-to-weight ratio compared to conventional internal combustion engines, and also improved balance. However, these advantages are offset by high production costs compared to conventional engines because of the sophisticated machinery needed for their assembly. The high production cost is reflected in the selling price, making them largely economically unviable. Numerous attempts have been made to address these problems, several examples of designs of which are described below.

U.S. Pat. No. 6,357,397 to Kull describes an axial bevel gear generated control motion. This motion is used to control an accelerating-decelerating vane motion in a cylindrical central axis main pressure chamber using a limited angle differential gear whose reversing gear receives an axial crank controlled motion from an orbiting bevel gear or, in a modified version, from an oscillation controlling barrel cam. The same bevel gear crank generated axial motion can also be used to provide an axial piston motion in cylinders with one or more pistons which can be in a stationary or rotating cylinder housing. In all the different models of engine, a valveless port communicates with a radial or axial flow distribution control, which is used for a pressurized fluid flow. This design is suited to external pressure or internal combustion engines in which the energy conversion comes from a fluid or combustion pressure to a powered output shaft rotation or in a reverse energy conversion mode.

Published United States patent application number US 2004/0107923 to Lawes describes a rotating cylinder valve engine, which includes an engine casing having two casing sections, a double piston and rotating cylinder assembly. The casing section has an internal chamber that extends from a open-end of circular cross-section towards a closed-end of the casing section. A circular flange extends radially outward from the open-end of the casing section. The flange has four lobe portions each formed with a bolt hole, and is formed with a circular radially inner recess. The casing section is formed with a fuel inlet port, port for a spark plug and an exhaust port.

Published United States patent application number US 2006/0283407 to Mann describes a rotary gasoline engine that has two sets of reciprocally moving pistons. The reciprocal output of the pistons is coupled to an undulating ramp, which converts the reciprocal motion to rotary motion. Although the engine casing has a hollow center, there is no drive shaft. Instead, dual rotary outputs are provided, one through a rotatable output block at the top end of the casing, the other through a rotatable block at the bottom end of the casing in response to the reciprocal motion of the pistons.

Published United States patent application US 2010/0108034 to Arseneau describes a rotary engine that has a driven output shaft, which is powered by internal combustion carried out in a cylinder. The combustion drives a piston and two crankshafts, which include contra-rotating drive gears meshed with a fixed gear ring. As the gears rotate, rotary motion is transmitted to the piston and the cylinder, the gear cage base, gears and ultimately to the output shaft.

Disadvantageously, while some of these designs address some of the problems, they are still overly complicated and require sophisticated machinery for their production. A number of the designs still seem to be unbalanced and require additional parts to counterbalance them. Furthermore, given the high temperatures that are produced during combustion and movement of the engine parts, there does not appear to be a satisfactory way of cooling the engines other than the use of a fluid coolant or by bulky air cooling fans. Further disadvantageously, the designs described above have many parts, which adds to their complexity and therefore weight. The weight problem and poor heat control causes less than efficient energy output. Moreover, it is likely that the designs would require considerable maintenance, and would likely be prohibitively expensive.

Thus, there is a need for an improved rotary engine with enhanced balance, low friction, low noise output and high torque, with low manufacturing cost and an affordable sales price. Also, it would be desirable to have a rotary engine which an efficient cooling system.

BRIEF SUMMARY

I now have designed a novel and unobvious balanced rotary engine, which significantly reduces, or essentially eliminates, the problems described above. My new rotary engine is about half the weight of other engines of the same cubic size (volume) because of its reduced number of parts. Advantageously, for this reduced cubic size, the rotary engine is able to generate significant torques and with that an improved fuel consumption efficiency. These two significant advantages are achieved because the engine operates almost "friction free". Furthermore, the rotary engine, again because of reduced part numbers has low vibration levels. The only vibration that exists is the pulse of the fuel combustion. In conventional internal combustion engines, specifically of the rotary engine type, the energy produced during rotation is generally applied to the side of the cylinder. In my new rotary engine, this energy transmits to the twin crankshaft. Twin connection rods or arms cause reduced piston side load. Furthermore, at the piston head, several thin compression rings provide low friction and eliminate the need to drive cams with heavy springs. In sum, the reduced friction and vibration translate into improved energy output with lower fuel consumption. To date in tests I have performed, my new rotary engine provides 38.6% fuel efficiency, which is unprecedented for an engine of this size. As mentioned above, of all the four stroke engines I know, the new rotary engine has the fewest parts count. From a manufacturing point of view, the reduced number of parts is significant, not only for reduced cost, but also for easy, fast and accurate assembly. Moreover, the parts used in the new rotary engine are mostly available for existing rotary engines. Indeed, of the parts used, few require custom manufacture. Finally, the reduction in parts has an additional operational advantage. Translation of rotational energy (torque) to a direct drive shaft does not need a reduction gearbox, which would ordinarily need more parts and therefore add weight to the engine.

Another advantageous feature of my rotary engine is its almost perfect balance at mid-stroke. In conventional rotary engines, parts must be added to the casing to provide counterbalance. The twin crankshafts independently rotate, but are attached to a single piston pin, which causes contra rotation or opposed rotation. This is because the twin crankshafts rotate relative to a main fixed gear, which is bolted to the main body of the engine. In my engine though, the fixed gear ring faces the piston, which allows for a more compact engine. Thus, by following the rotary engine as it moves through a single cycle, in the top and bottom positions the engine counterweight balances the reciprocation of the piston and parts of the connecting rod movement. It is in mid stroke that the counterweight is perfectly opposed thereby balancing the rotary engine in an almost perfect fashion. To my knowledge, this is the only single rotary engine that is balanced almost perfectly at mid stroke, without having to add parts to counterbalance the engine.

Accordingly, in one embodiment there is provided a balanced rotary engine for applying torque to a drive shaft, the rotary engine comprising:

an outer casing having a main drive case;
a cylinder rotably mounted in the outer casing;
a piston mounted for longitudinal movement within the cylinder;
first and second connecting arms, each connecting arm having a first connecting end and a second connecting end, the first connecting ends being connected to the piston;
first and second crankshafts, each crankshaft being rotably connected to the second connecting end of the connecting arms;
first and second drive wheels contra-rotably connected to the respective first and second crankshafts; and
a fixed drive ring having a circumferentially disposed drive member surface, the fixed drive ring being mounted in the main drive case so that the drive member surface is disposed towards the piston, the first and second drive wheels meshing with the drive ring.

In one example, a drive assembly includes the connecting arms, the cranks shafts, the drive wheels and the fixed drive ring, the drive shaft being connected to the drive assembly and extending away therefrom. The cylinder has a cylinder opening with a first longitudinal axis and a cylinder base, the cylinder base having first and second semi-circular indents located opposite each other, the cylinder base being sized and shaped for cooperation with the drive assembly.

In one example, the first and second drive wheels are mounted for contra-rotation about a second axis of rotation, the second axis of rotation being disposed orthogonal to the first axis of rotation. The cylinder has a cylinder circumference, and the cylinder base having a cylinder base circumference, the cylinder base circumference being greater than the cylinder circumference.

In another example, the first and second drive wheels are first and second gear pinions each having a plurality of circumferentially disposed teeth, each of the gear pinions are beveled towards each other. The fixed drive ring has a plurality of circumferentially disposed inwardly beveled teeth, the beveled teeth of the gear pinions and the fixed drive ring being cooperable for meshing during contra-rotation of the gear pinions.

In yet another example, the first and second cranks shafts each have a throw for connecting the crank shaft to the connecting arm, and a curvature located away from the throw.

In still another example, a piston pin connects the first connecting ends of the connecting arms to the piston, the piston pin being disposed orthogonal to a cylinder opening first longitudinal axis.

In one example, the piston, the connecting arms and the crankshafts are triangulated when the piston is located in the cylinder at mid stroke so as to balance the engine.

In another example, an arm spacer is located between the first and second connecting arms, the spacer extending from between the connecting arms to between the first and second crankshafts.

In another example, a first crankshaft bearing is connected to both the first crankshaft and the first gear pinion, the first crankshaft bearing being located therebetween; and a second crankshaft bearing is connected between the second crankshaft and the second gear pinion and located therebetween. First and second end bearings are connected to the respective first and second gear pinions.

In another example, a cylinder bearing is connected between the cylinder and the outer casing, the cylinder being sealingly connected to the outer casing.

In another example, the outer casing includes a base body and a mid section body, the base body having a base body opening, the drive shaft being sealingly connected to the base body opening. Drive shaft bearings are located between the drive shaft and the base body.

In one example, the rotary engine further comprises: a cylinder head having located therein at least one inlet port, at least one outlet port, and an ignition source port, the cylinder head being connected to an upper portion of the cylinder for rotatable movement therewith; and a cylinder rotary disc sealingly connected to the cylinder head and the upper portion of the cylinder, the cylinder rotary disc being located therebetween. The cylinder rotary disc includes a cylinder rotary disc opening, and a cylinder rotary disc ignition source port, the ports in the cylinder head being sequentially registered with the cylinder rotary disc opening as the cylinder rotates within the outer casing. An underside of the cylinder head includes first and second seal rings circumferentially spaced apart and concentric with the ignition source port for sealingly mounting with the cylinder; and at least two seal rings are mounted in corresponding seal grooves located around the inlet port and the outlet port in the cylinder head, the seal rings being eccentrically located relative to the cylinder head. A plurality of first resilient members are connected to the cylinder rotary disc and the cylinder head.

In one example, one or more thermal transfer members are located between the cylinder head and the cylinder rotary disc. The seal grooves include a plurality of second resilient members.

In one example, the rotary engine further includes a cooling assembly located at an upper end of the cylinder, the cooling assembly includes a plurality of air-cooled fins, the fins being circumferentially disposed about the cylinder and projecting outwardly therefrom.

In yet another example, the outer casing includes a plurality of circumferentially disposed openings. The openings are angled. The openings are in fluid communication with the air inlet In one example, the cooling assembly includes an air inlet passageway which extends through the cylinder head to the fins In another example, the cooling assembly further includes a plurality of thermal transfer pads in communication between the cylinder head and the ring.

In yet another example, a plurality of cooling openings located on an upper portion of the cylinder head.

According to another embodiment, there is provides a drive assembly for use with a rotary engine, the assembly comprising:

a piston having a piston pin, the piston being located in a rotatable cylinder for recirpocal movement therein;

first and second connecting arms connected to the piston pin and moveable relative to each other;

a gear assembly located away from the piston and in communication therewith, the gear assembly having first and second contra-rotatable crankshafts connected to two gear pinions; and a fixed gear ring having a plurality of teeth, the teeth being disposed such that they face the piston, the gear pinions meshingly engage with the fixed gear ring teeth when the crankshafts move in a contra-rotatable fashion.

According to another embodiment, there is provided a seal assembly for use with a cylinder head and a cylinder, the seal assembly comprising:

a cylinder head underside having an inlet opening, an outlet opening and an ignition source opening, each of the openings having circumferentially disposed an outlet opening groove, an inlet opening groove; an ignition source groove, the openings being disposed equidistant from each other; and a plurality of ring seals sealingly cooperable with the grooves; and a cylinder disc, the cylinder disc having a cylinder disc igntion opening and an aperture therein registerable with either of the inlet opening or the outlet opening in the cylinder head when the cylinder rotates about a longitudinal axis, the cylinder disc being sealingly mountable between the cylinder head and the cylinder.

According to another embodiment, there is provided a cooling system for use with a rotary engine, the cooling system comprising:

a cylinder head for sealing engagement with a cylinder; and a cylinder disk having at least one thermal transfer pad mounted thereon for cooperation with the cylinder head, the thermal transfer pad being located to transfer thermal energy form the cylinder to the cylinder head.

According to another embodiment, there is provided a cooling system for use with a rotary engine, the cooling system comprising:

a fan mounted on the cylinder head;

a cool air inlet passgeway interconnecting first and second air inlet openings; and an air outlet opening located between the first and second inlet openings, the fan being mounted for rotation such that cool air is drawn into the first and second inlet openings and is forced onto the fan, the fan being in communication with hot surfaces in the engine, such that cool air moving across the fan causing thermal transfer thereto, the warm air being moved away from the engine via the outlet openings.

BRIEF DESCRIPTION OF THE DRAWINGS

These and other features of that described herein will become more apparent from the following description in which reference is made to the appended drawings wherein.

DETAILED DESCRIPTION

Definitions

Unless otherwise specified, the following definitions apply:

The singular forms "a", "an" and "the" include corresponding plural references unless the context clearly dictates otherwise.

As used herein, the term "comprising" is intended to mean that the list of elements following the word "comprising" are required or mandatory but that other elements are optional and may or may not be present.

As used herein, the term "consisting of" is intended to mean including and limited to whatever follows the phrase "consisting of". Thus, the phrase "consisting of" indicates that the listed elements are required or mandatory and that no other elements may be present.

1. General Rotary Engine Construction

Figure 4:
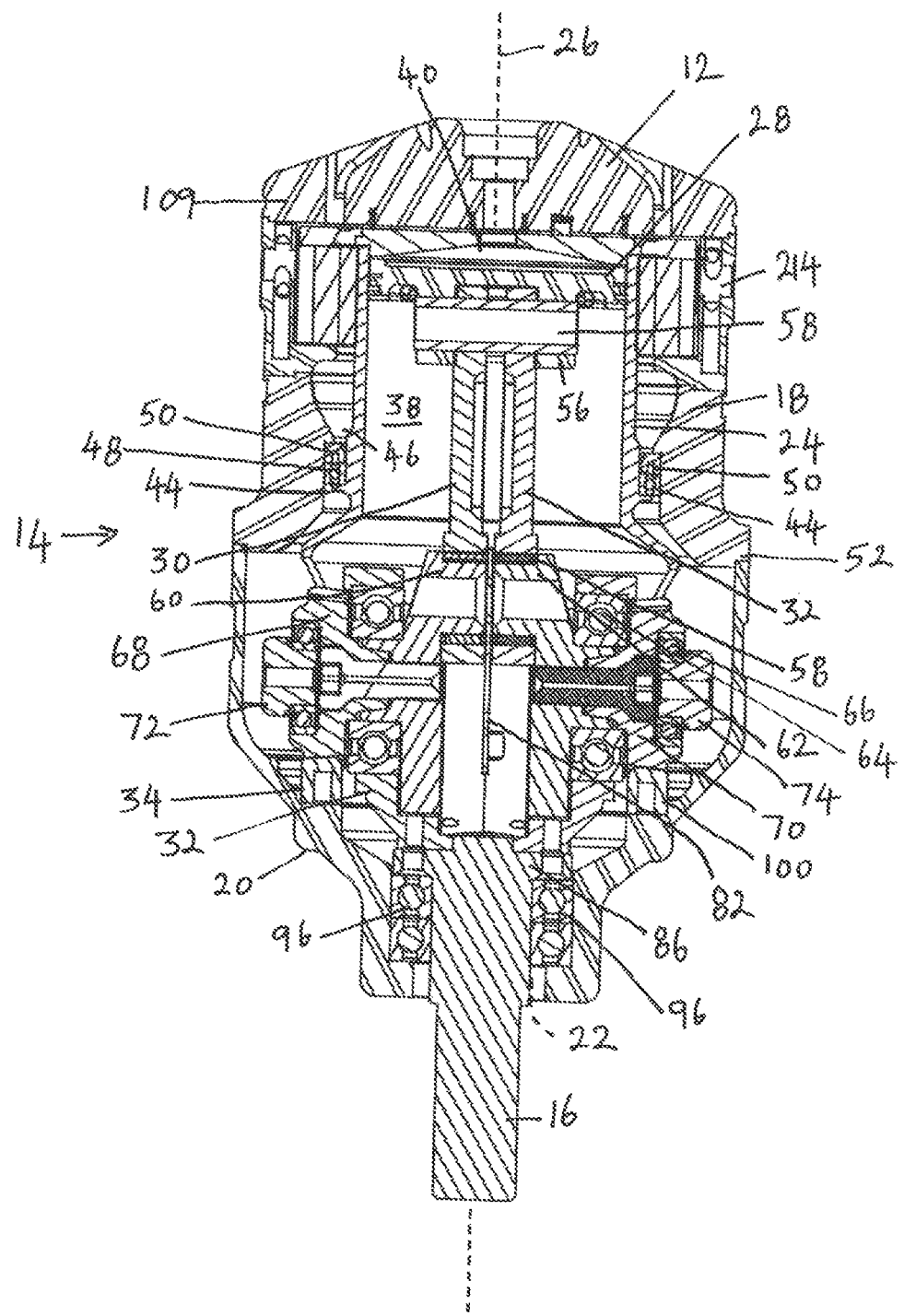
FIG. 4 is a longitudinal cross-sectional detailed view of the engine of FIG. 2 showing a piston at a top of a cylinder.
Figure 5:
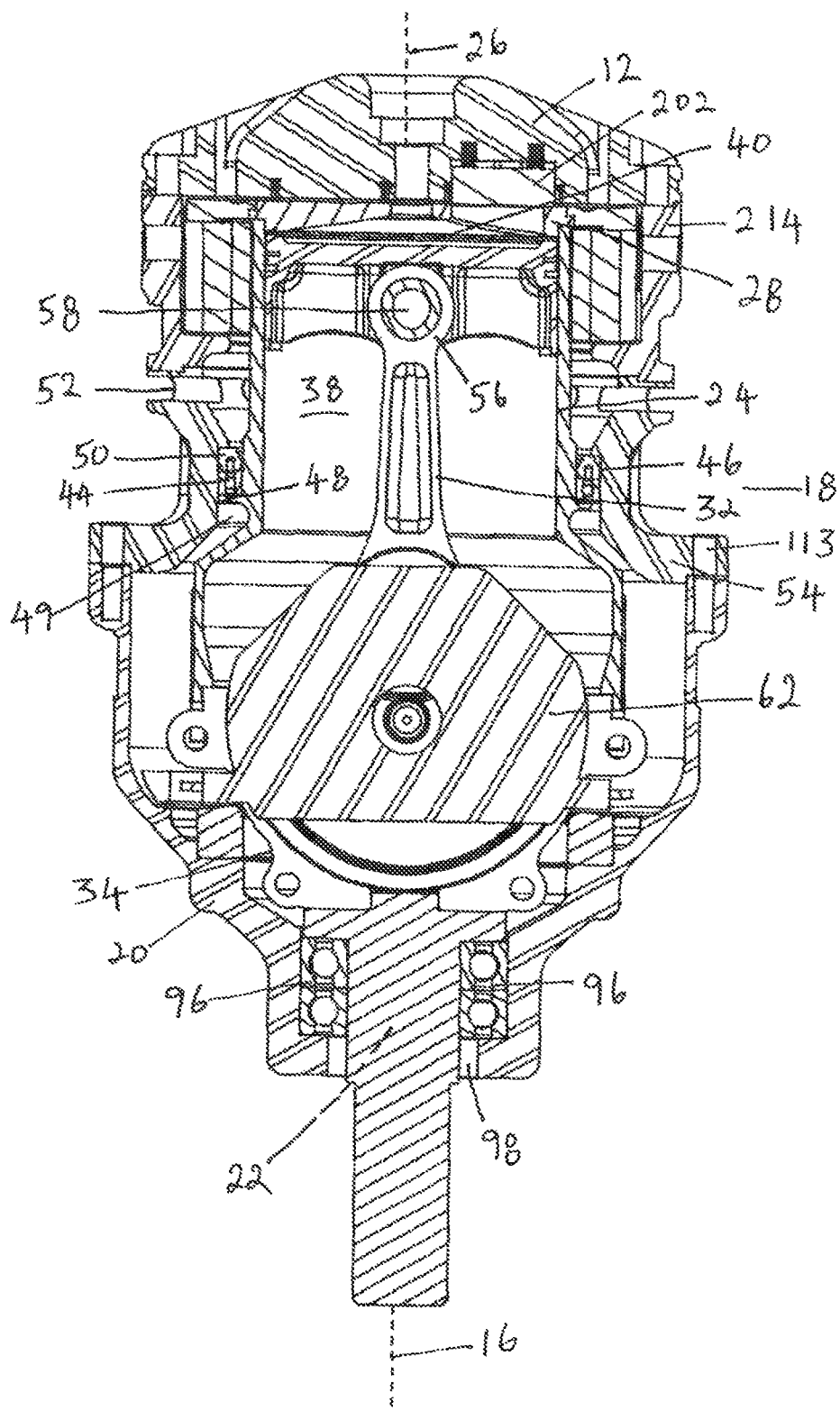
FIG. 5 is a longitudinal cross-sectional detailed view of the engine showing a rod spacer with the piston at the top of the cylinder.
Figure 7:
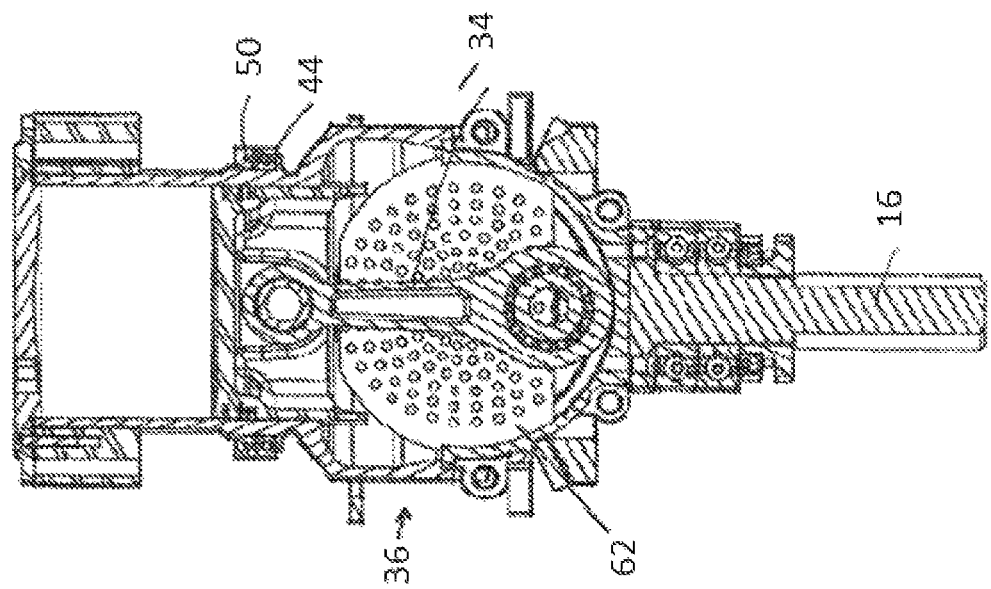
FIG. 7 is another longitudinal cross-sectional detailed view of the engine with the piston at the bottom end of the cylinder.
Figure 6:
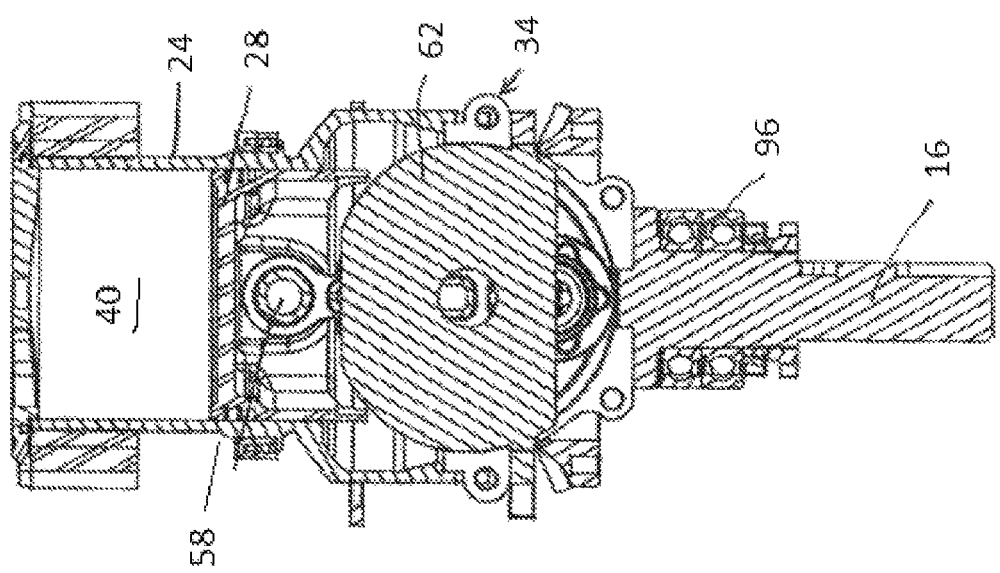
FIG. 6 is a longitudinal cross-sectional detailed view of the engine with the piston at the bottom end of the cylinder.

Referring now to FIGS. 1-11, a balanced rotary engine is shown generally at 10. Broadly speaking, the rotary engine 10 includes a domed cylinder head 12, an outer casing 14, and a drive shaft 16 extending away from the outer casing 14. The outer casing 14 includes a mid body section 18, a base body section 20 and a base body opening 22. When viewed in longitudinal cross section, as best seen in FIGS. 4 and 5, the detail of the rotary engine 10 becomes apparent. Thus, located in the outer casing 14 is a cylinder 24, which is sealingly mounted therein for rotation about a longitudinal axis 26; a piston 28; two connecting arms (rods) 30, 32; and a drive assembly 34. The drive shaft 16 is in communication with the drive assembly 34 and extends away from the base body section 20 of the outer casing 14. For ease of describing the orientation of the numerous parts of the engine, throughout this description the cylinder head 12 is referred to as being an upper or top part of the engine 10, whereas the base body section 20 is referred to as being located at a lower or bottom part of the engine 10. The rotary engine 10 is essentially a modular construction, which allows easy replacement of parts and interchangeability. Additionally, the modular construction affords versatility in power train design and function.

As best illustrated in FIGS. 4 and 5, a main drive case (cradle) 36 is located in the base body section 20 of the outer casing 14. The cylinder 24 has a chamber 38 in which is the piston 28 is mounted. A combustion chamber 40 is located between the cylinder head 12 and the piston 28. The piston 28 is mounted within the chamber 38 for longitudinal movement along the longitudinal axis 26 that bisects the rotary engine 10. A cylinder bearing 44 is located between an outer surface 46 of the cylinder 24 and an inner surface 48 of the mid body section 18 of the outer casing 14. A cylinder seal 50 is located adjacent the cylinder bearing 44 to prevent leakage of, for example, lubricant. The cylinder bearing 44 and the cylinder seal 50 are located adjacent a junction 52 between the mid body section 18 and the base body section 20 and in a cavity 49 located in the mid body section 20. The cylinder bearing 44, in this case, is a ball race, although one skilled in the art will recognize that other types of bearings are available.

Figure 1:
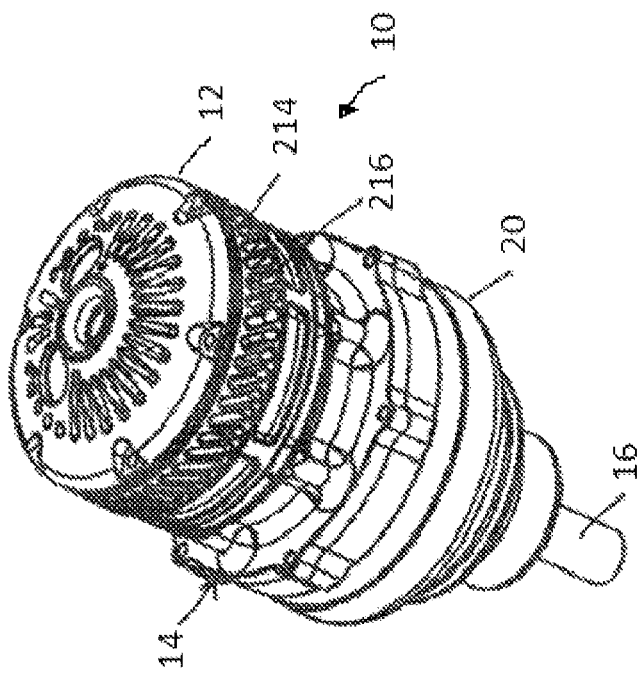
FIG. 1 is perspective view of an embodiment of a balanced rotary engine.
Figure 1:
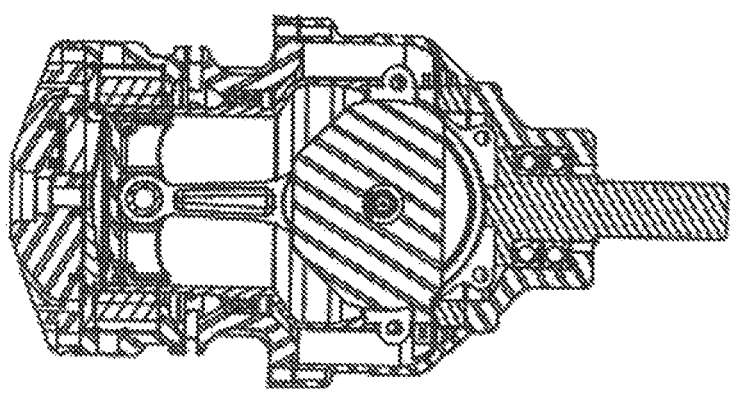
Figure 2:
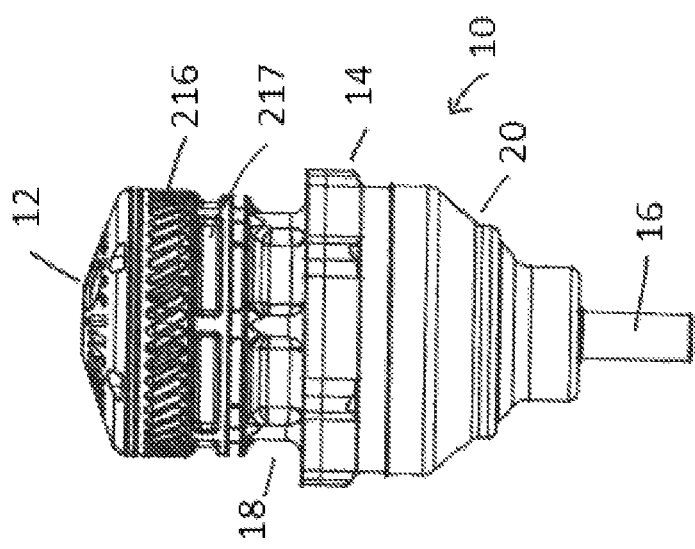
FIG. 2 is a side view of the engine as illustrated in FIG. 2.
Figure 2:
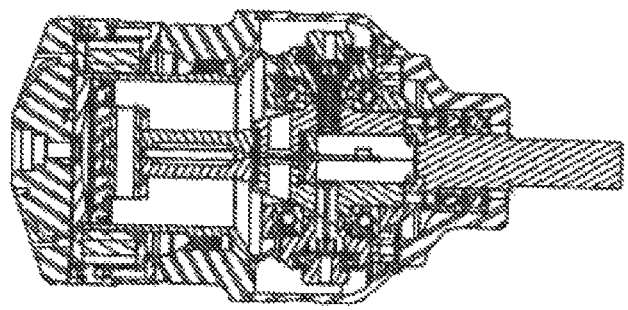
Figure 3:
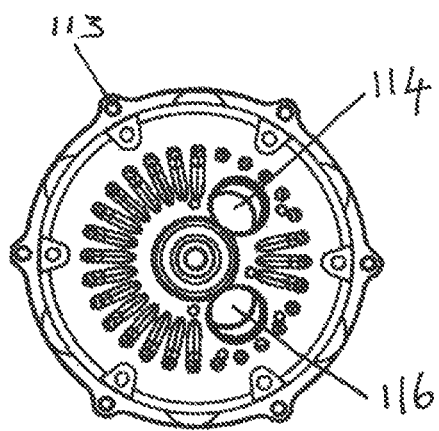
FIG. 3 is a top view of the rotary engine of FIG. 1 showing an air inlet port, an exhaust outlet port and a plurality of circumferentially disposed body bolts.

Referring now to FIGS. 2 and 5, the mid body section 18 is narrower at the junction 52 compared to an upper part 54 of the base body section 20. The base body section 20 tapers down to the base body opening 22 and ultimately towards the drive shaft 16. When viewed in longitudinal cross section as best seen in FIG. 4, the outer casing 14 is, in essence, a sidewall that envelops the moving parts of the rotary engine 10. As seen in FIG. 1, this gives the impression of a compact, symmetrical and aesthetically pleasing rotary engine 10.

2. The Drive Assembly

Figure 9:
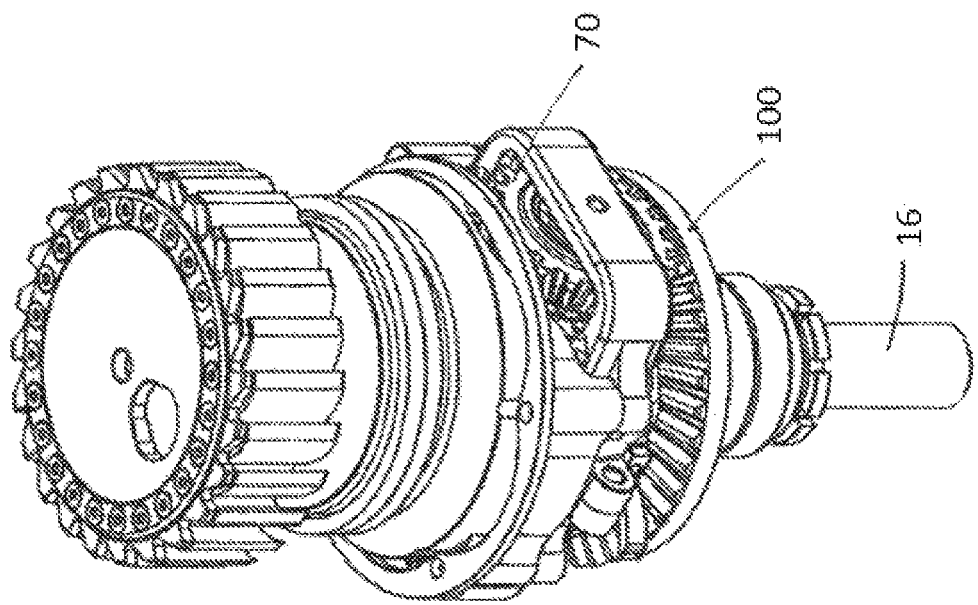
FIG. 9 is a perspective view the engine showing the location of the drive assembly.
Figure 8:
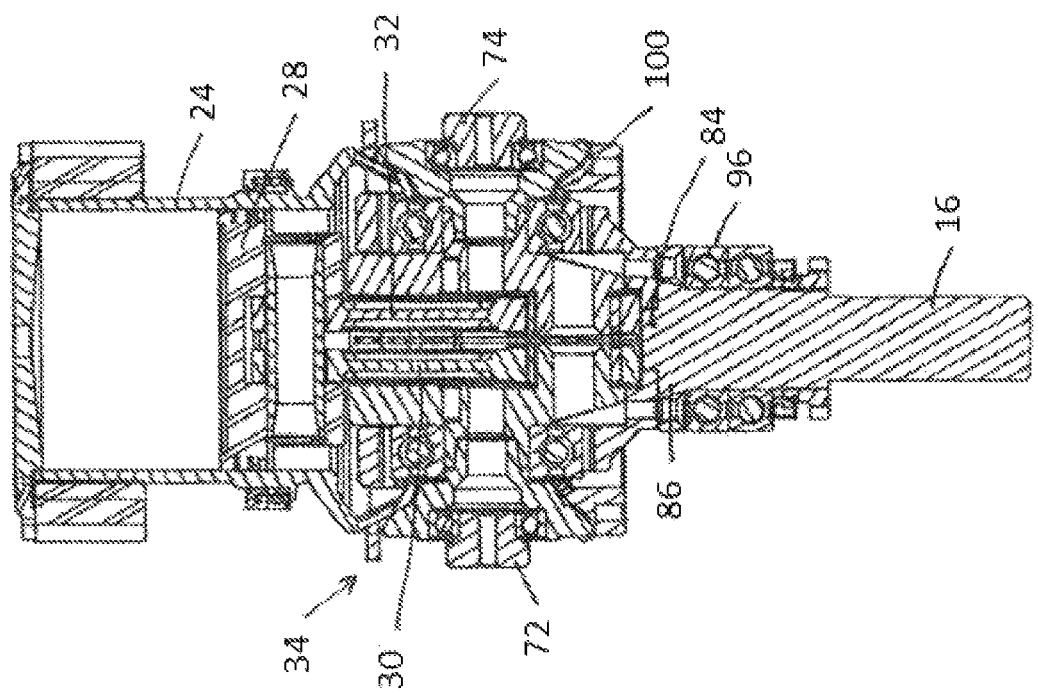
FIG. 8 is a simplified longitudinal cross-sectional detailed view of the engine with the piston at the bottom end of the cylinder.
Figure 10:
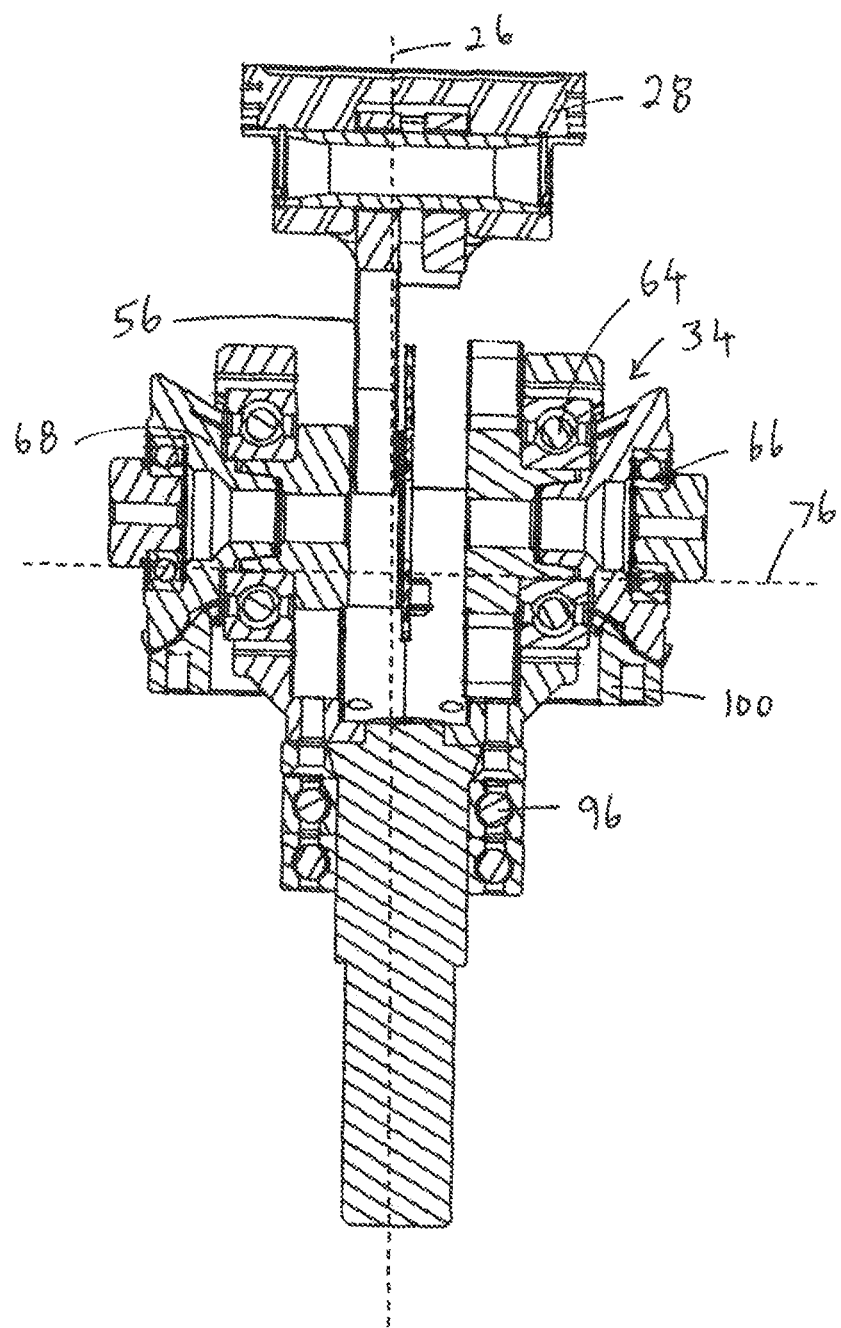
FIG. 10 is a simplified longitudinal cross-sectional view of the engine with the piston located at the mid-position in the cylinder showing the connecting arm.
Figure 13:
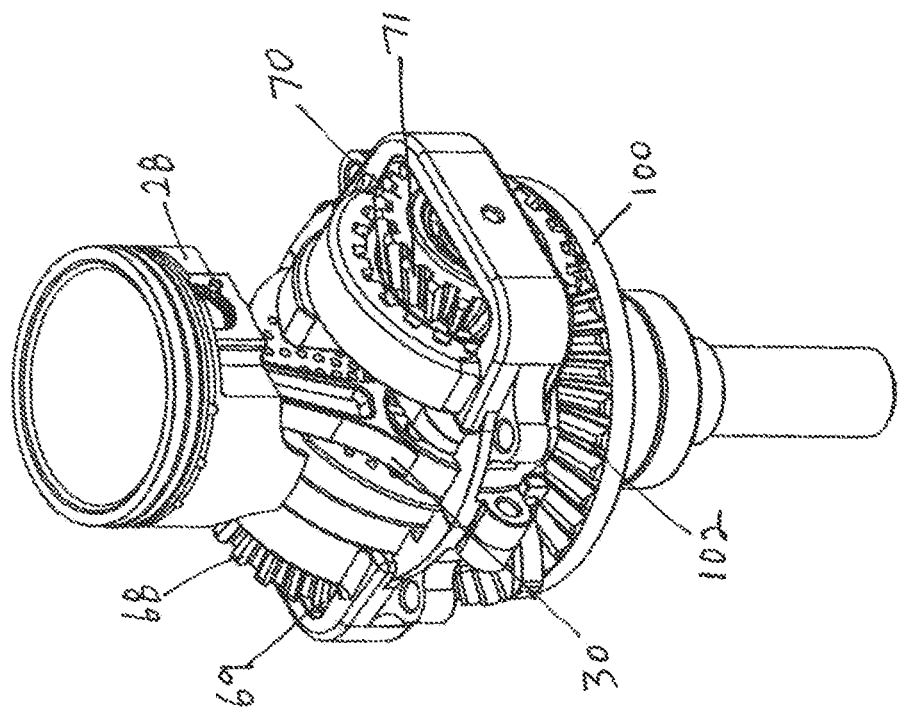
FIG. 13 is a top perspective view of the drive assembly of FIG. 12.

Referring now to FIGS. 4, 5 to 33, the two connecting arms 30, 32 extend from the piston 28 towards the drive assembly 34. Each of the connecting arms 30, 32 are rods that each have a first arm connecting end 56 and a second arm connecting end 58. The first connecting ends 30 of each connecting arm 30, 32 is connected to the piston 28. A single piston pin 58 is located in the piston and disposed orthogonal to the longitudinal axis 26. The drive assembly 34 is located away from the piston 28 and disposed within the main drive case 36. The drive assembly 34 includes first and second crankshafts 60, 62, each of the crankshafts being rotably connected to the second arm connecting end 58 of the connecting arms 30, 32. Each of the crankshafts 60, 62 has a throw 67, 69 (or crankshaft pin) connected to the gear pinions 68, 70, located at the end of a crankshaft connecting member 75, 77. Moving away from the first and second crankshafts 60, 62, first and second crankshaft bearings 64, 66 are connected to the respective first and second crankshafts 60, 62. First and second beveled gear pinions (gear drive wheels) 68, 70 are secured to the first and second crankshaft bearings 64, 66 and to the second arm connecting end 58 of the connecting arms 30, 32 using crank gear bolts 72, 74. The beveled gear pinions 68, 70 are tapered towards the each other and towards the connecting arms 30, 32. As best seen in FIG. 10, the first and second gear pinions 68, 70 are mounted for contra-rotation about a second axis of rotation 76 that is disposed orthogonal to the first longitudinal axis 26. The first and second gear pinions 68, 70 each has a first drive member which is, on each gear pinion a plurality of circumferentially disposed gear pinion teeth 69, 71, as best seen in FIG. 13. Thus, the first and second gear pinions 68, 70 are contra-rotably connected to the respective first and second crankshafts 60, 62.

The drive assembly 34 is held together using first and second end bearings 78, 80 that are bolted together using bolts 79, 81 to ensure a compact arrangement.

Referring back to FIGS. 4 and 5, a rod spacer 82 is located between the first and second connecting arms 30, 32 and extends from between the arms to between the first and second crankshafts 60, 62. The rod spacer 82 help maintain the two connecting arms 30, 32 and the crankshaft bearings 64, 66 on the crank gear bolts 72, 74 and stops them from loosening and becoming free.

Figure 11:
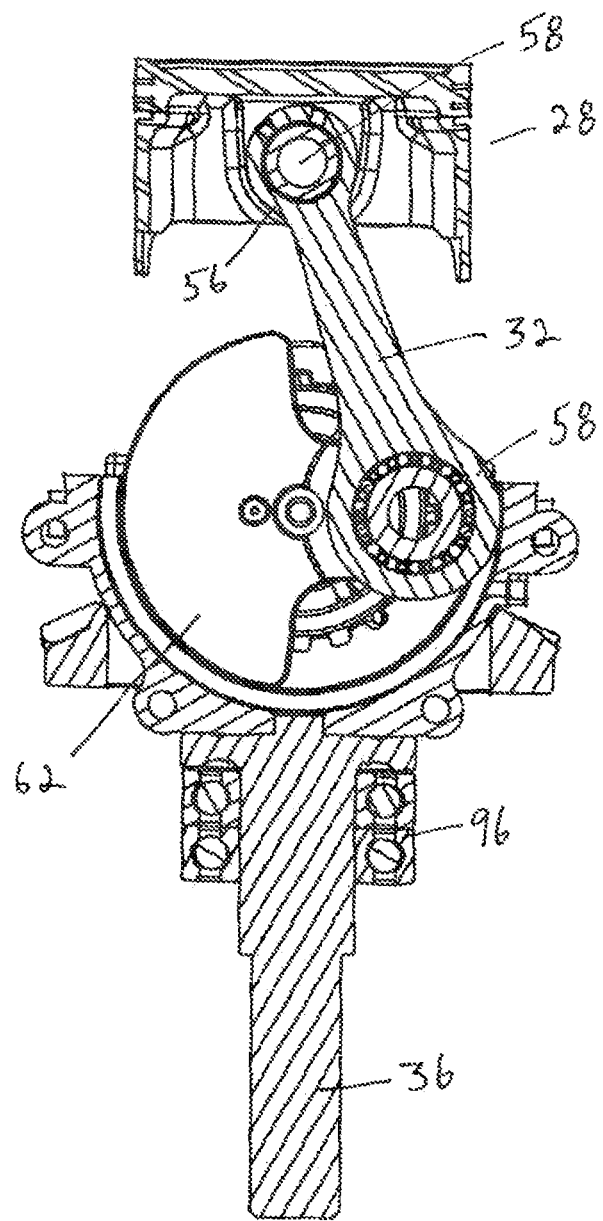
FIG. 11 is a simplified longitudinal cross-sectional view of the engine with the piston at mid-stroke showing the crankshafts.
Figure 12:
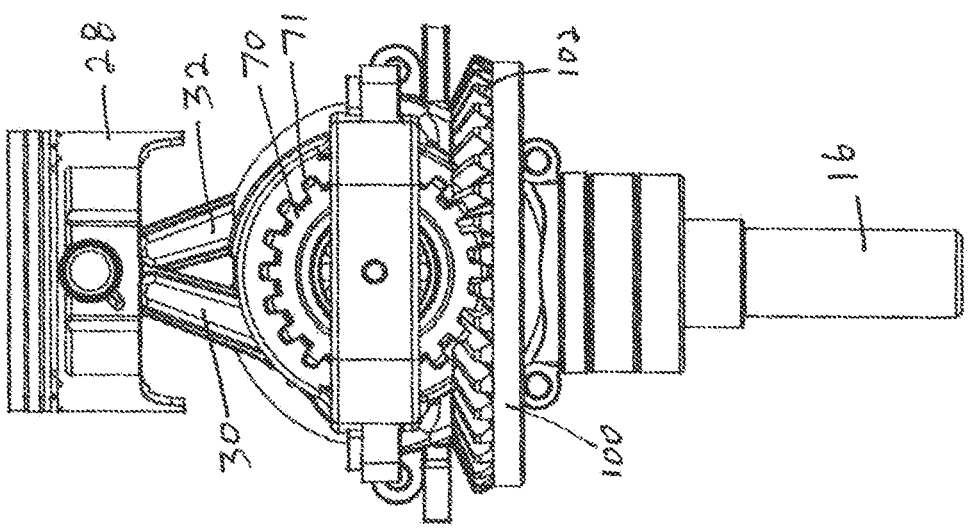
FIG. 12 is a simplified side view of a drive assembly showing a gear pinion meshed with a fixed gear ring.
Figure 14:
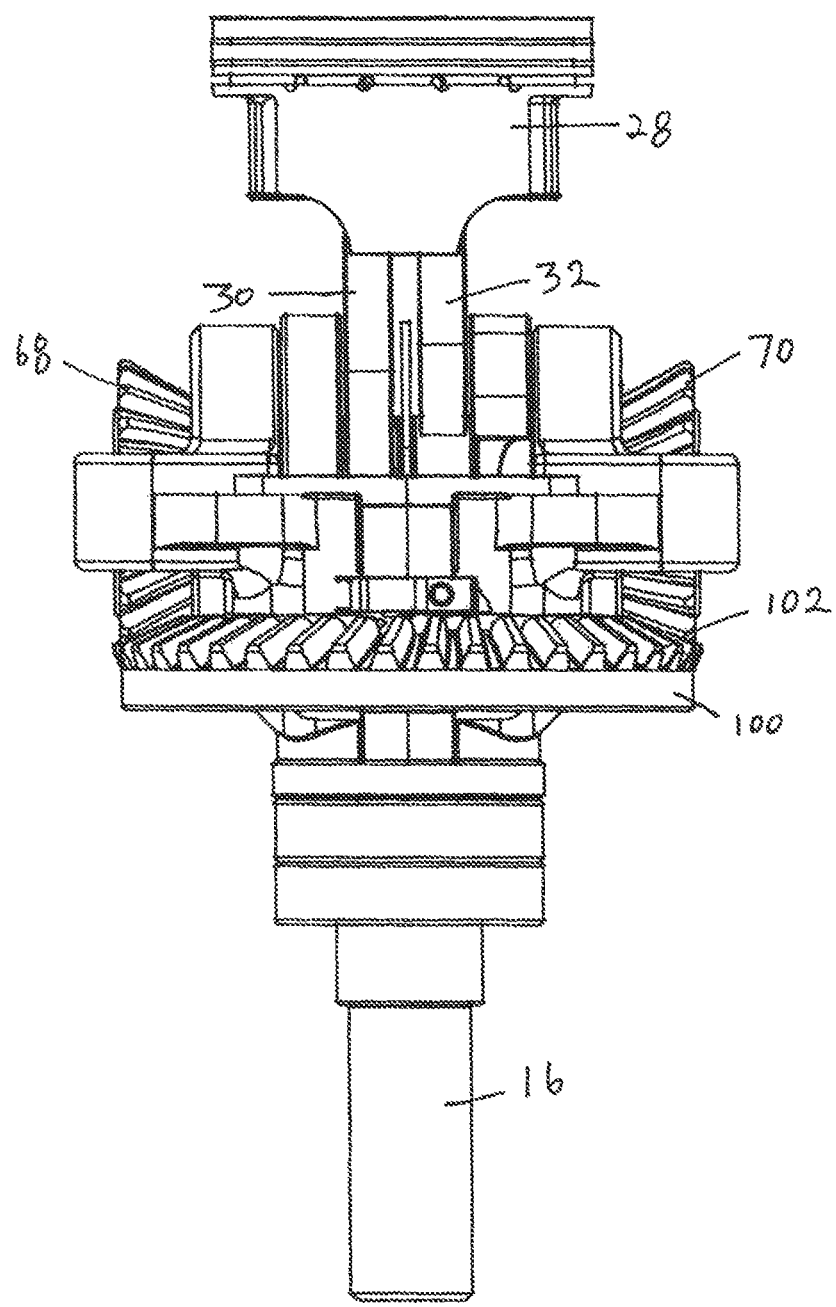
FIG. 14 is another side view of the drive assembly showing two beveled gear pinions and a fixed gear ring.
Figure 23:
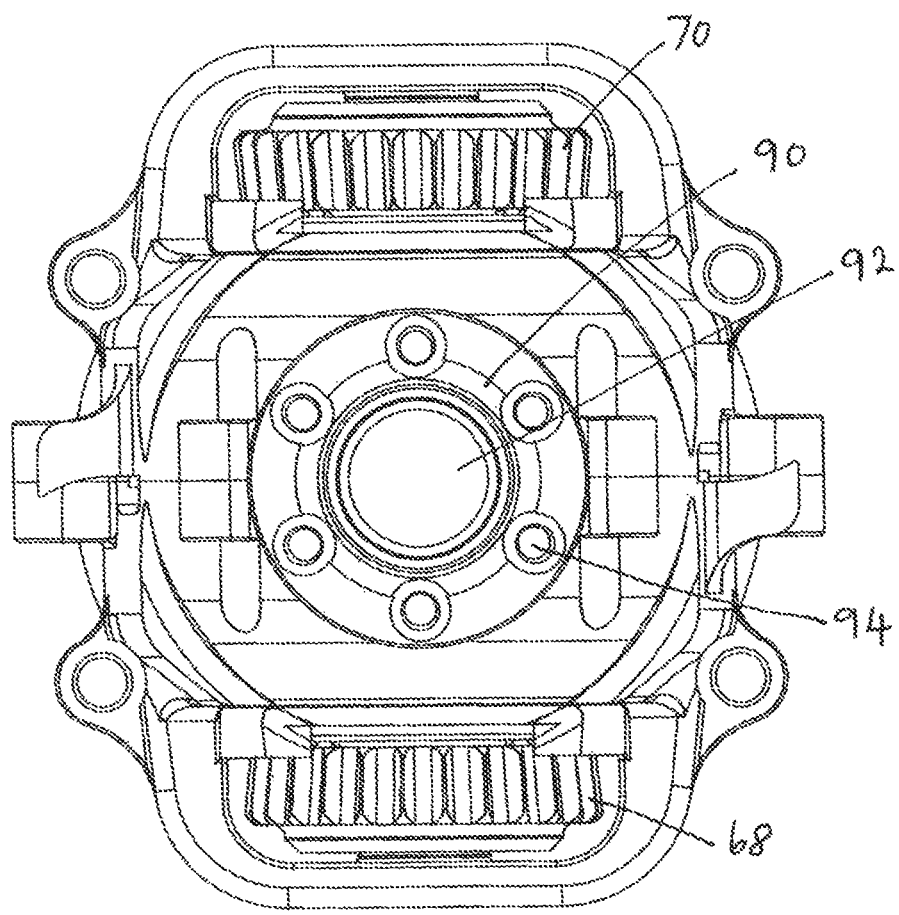
FIG. 23 is a detailed bottom view of the gear assembly.
Figure 24:
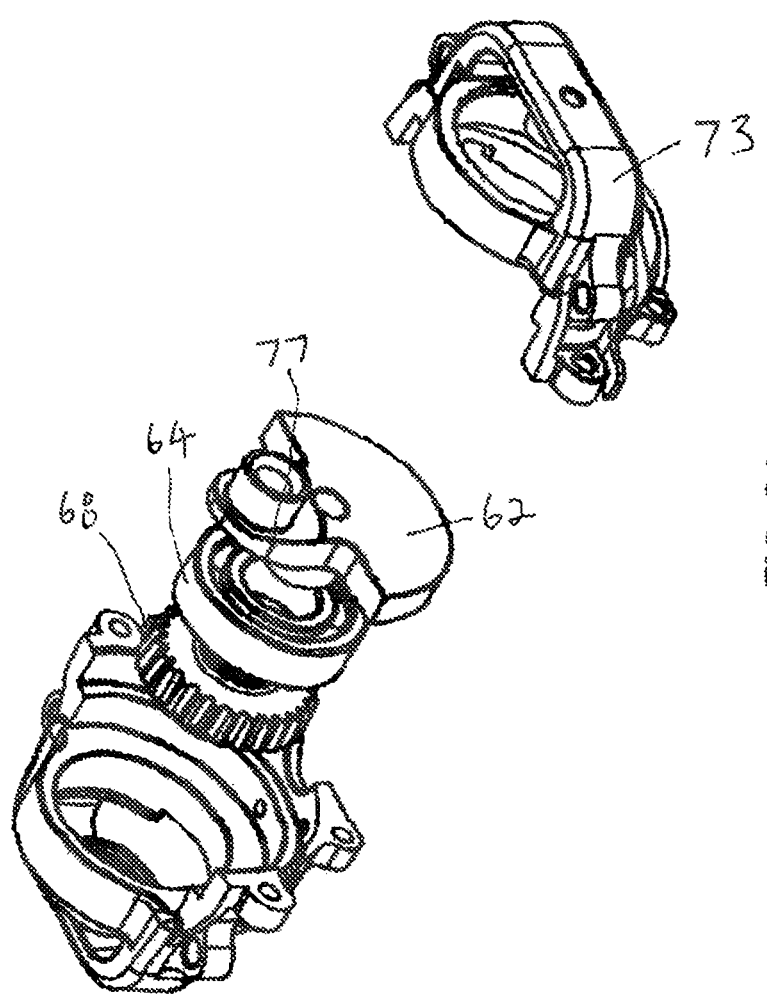
FIG. 24 is a perspective exploded partial view of a single crankshaft and gear pinion.
Figure 25:
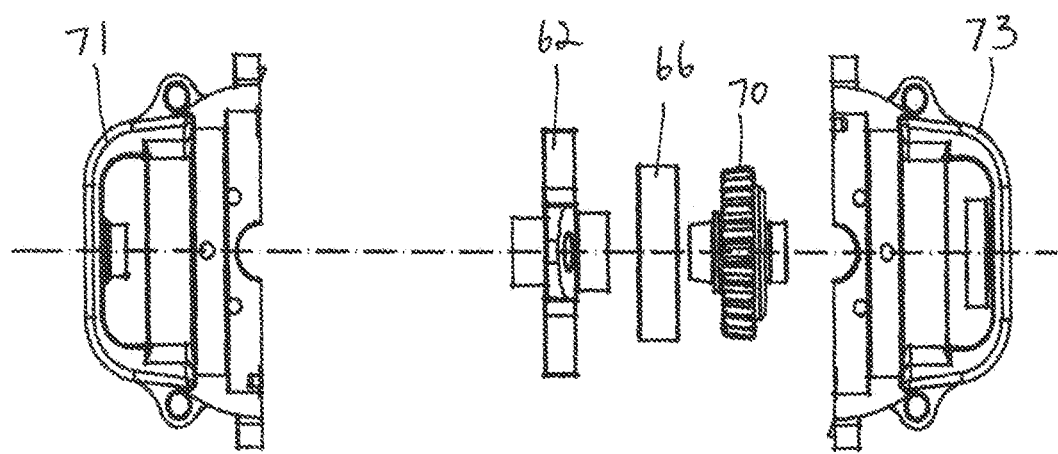
FIG. 25 is a top view of the exploded view of FIG. 24.
Figure 26:
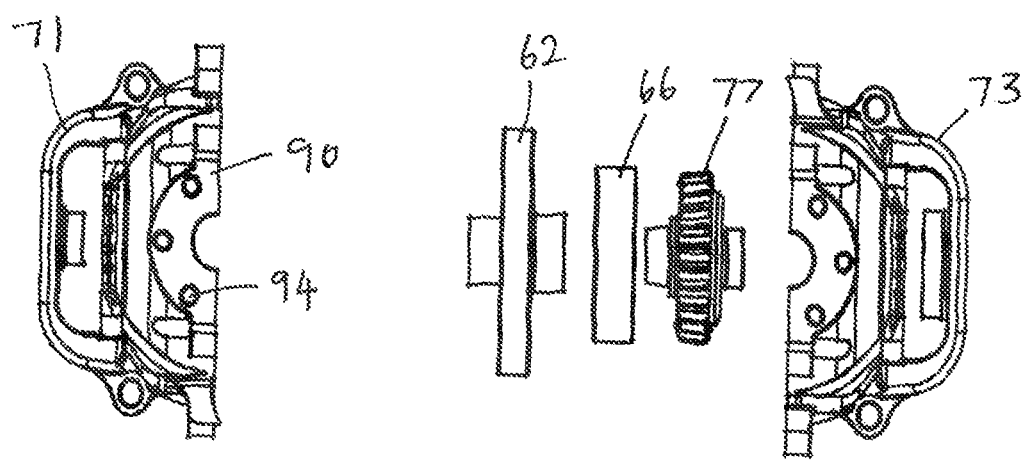
FIG. 26 is a top view of FIG. 25.
Figure 27:
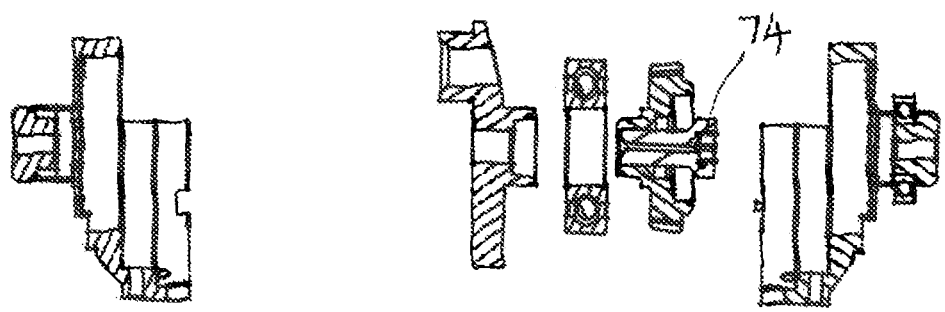
FIG. 27 is another top view of FIG. 25.

Referring now to FIGS. 4, 9 to 23, the drive shaft 16 is connected to the drive assembly 34 and is co-axial with the first longitudinal axis 26. The drive shaft 16 includes a drive shaft projection 84 and a circumferentially disposed flange 86 having a plurality of holes 88 therein. The drive assembly 34 includes a drive assembly connecting member 90 having a centrally disposed opening 92 located therein to receive the drive shaft projection 84 and a plurality of circumferentially disposed holes 94, as best seen in FIG. 23. The drive shaft 16 is mechanically secured to the drive assembly 34 using bolts driven through the holes 88 and the holes 94. Other means of mechanically securing the drive shaft 16 to the drive assembly 34 can be used and are known to those skilled in the art. For example, on the flange 86 a plurality of small projections (nubbins) can be used to be secured in the circumferentially disposed holes 94 instead of using bolts. To permit rotation of the drive shaft 16 when the drive assembly 34 is in operation, drive shaft bearings 96 surround the drive shaft 16 and abut the underside of the circumferentially disposed flange 86. The drive shaft bearings 96 are located adjacent the base body opening 22 and are sandwiched between the drive shaft 16 and the base body section 20, as best seen in FIGS. 5 and 10. The drive shaft bearings 96 are ball races. One skilled in the art will readily recognize that other types of bearing are available to permit smooth rotation of the drive shaft 16 in the base body opening. A drive shaft seal 98 is located between the drive shaft 16 and the lower part of the base body section 20 such that the drive shaft 16 is rotably and sealingly connected to the base body section 20. As best seen in FIGS. 9, 12 and 13, the drive assembly 34 further includes a fixed gear drive ring 100, which has a circumferentially disposed drive member surface with a plurality of circumferentially disposed teeth 102. The fixed gear ring 100 is fixably mounted in the main drive case 36 so that the teeth 102 are disposed towards the piston 28. The circumferentially disposed teeth 102 are inwardly beveled to permit cooperable meshing thereof with the corresponding gear pinion teeth 69, 71 during contra-rotation of the gear pinions 68, 70. This new orientation of the fixed gear ring 100 towards the piston 28 allows considerable reduction in engine size because all the available inner space of the lower casing is used to house the drive assembly 34.

As best seen in FIGS. 24, 25, 26 and 27, two end cap members 71, 73 are bolted together.

As best seen in FIGS. 11, 15, 16 and 17, the perfect balance of the engine 10 with the piston 28 at mid-stroke is achieved because the two contra-rotatable crankshafts 60, 62 are orientated such that the curvature 63, 65 of each crankshaft 60, 62 are located 90 degrees to the first longitudinal axis 26. When viewed from the side, as best seen in FIG, 15, the two connecting arms 30, 32 and the two crankshafts 60, 62 are triangulated with the pin 58 being located at the apex of the triangle. At mid stroke, the curvatures 63, 65 of the crankshafts 60, 62 are co-planar.

Figure 30:
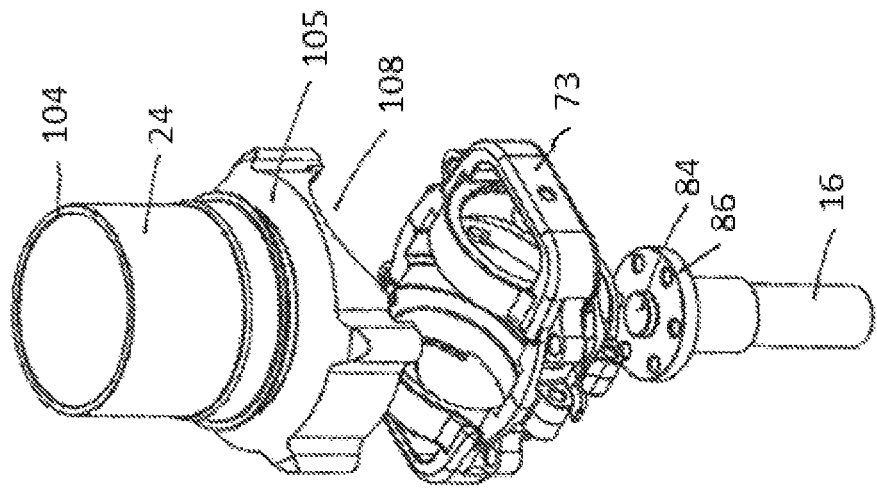
FIG. 30 is a perspective exploded view showing the cylinder and the drive assembly.
Figure 29:
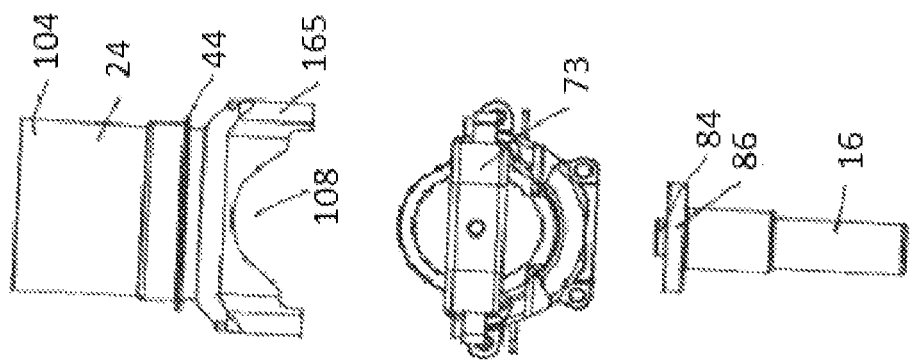
FIG. 29 is another exploded view of FIG. 28.
Figure 28:
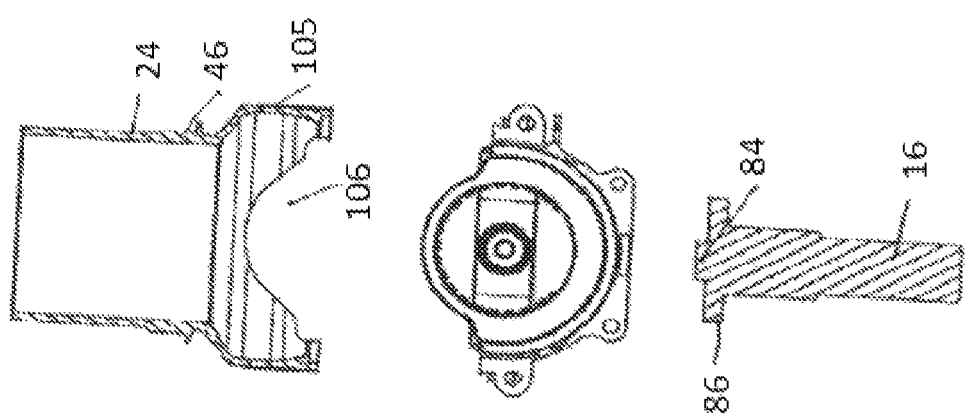
FIG. 28 is an exploded view showing the cylinder and the drive shaft around the drive assembly
Figure 31:
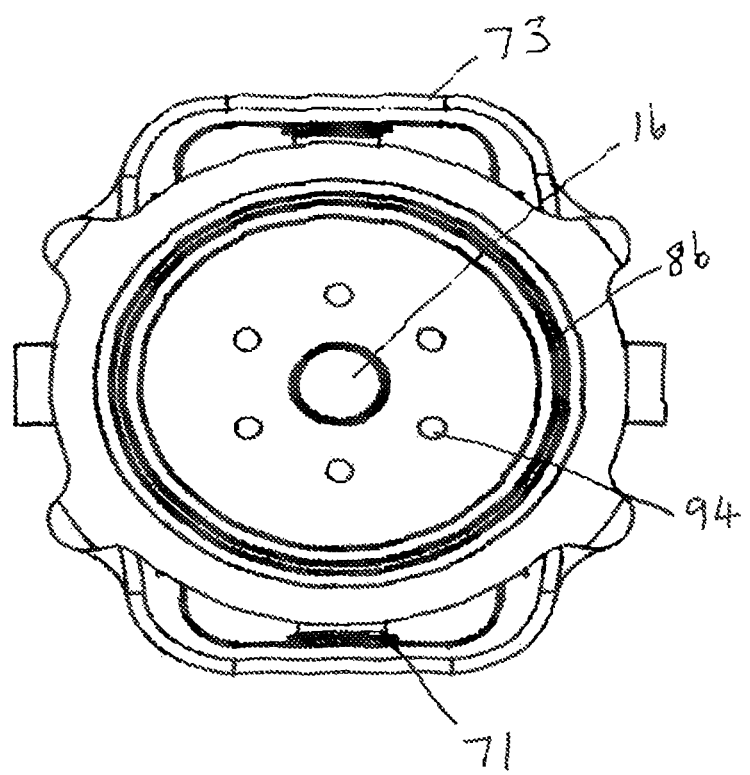
FIG. 31 is a bottom view of the drive assembly.
Figure 33:
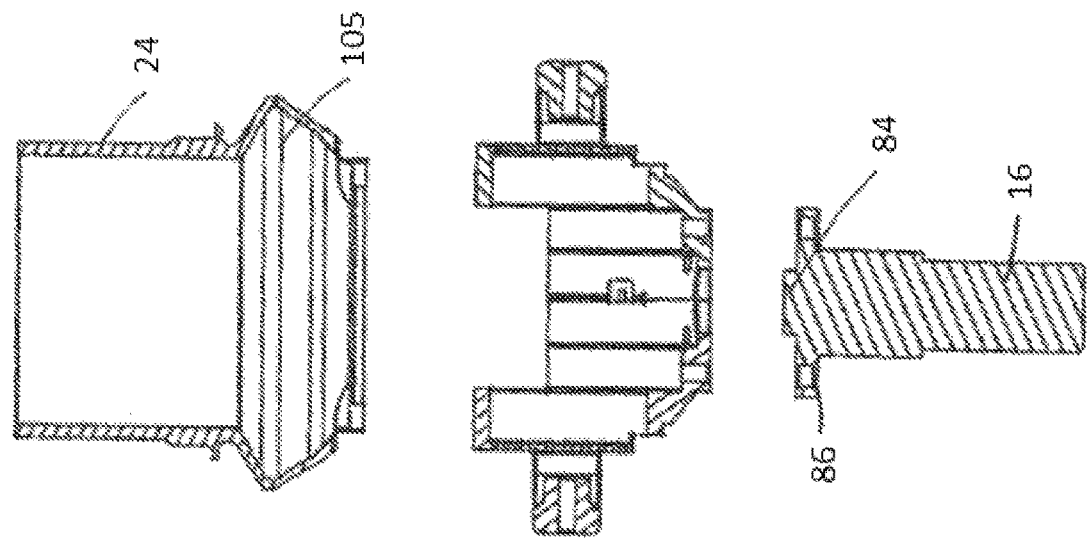
FIG. 33 is an exploded, simplified view of FIG. 32.
Figure 32:
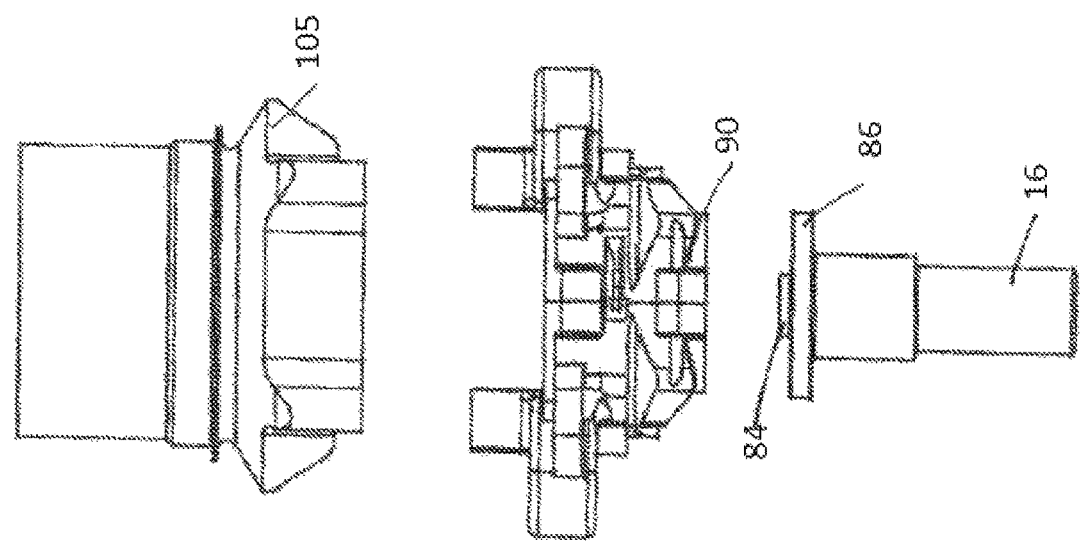
FIG. 32 is an exploded side view of the cylinder, the drive assembly and the drive shaft.
Figure 35:
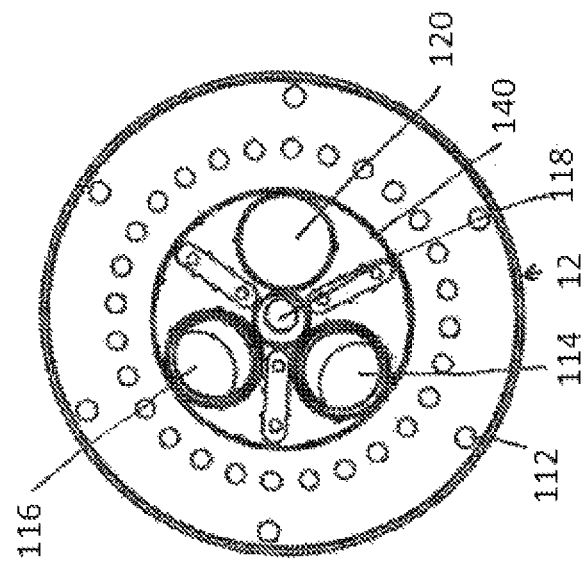
FIG. 35 is an a bottom view of the cylinder head.

Referring now to FIGS. 28 to 30, the cylinder 24 has an upper cylinder portion 104 having a cylinder circumference, and a cylinder base 105 that has a cylinder base circumference. The cylinder base 105 circumference is greater than the upper cylinder portion 104 circumference. The cylinder base 105 includes two semi-circular indents 106, 108 which are located on opposite sides of the cylinder base 105. The semi-circular indents 106, 108 are sized and shaped to cooperate with the drive assembly 34, which helps to align the cylinder 24 with the drive assembly 34 simply and precisely during assembly. Furthermore, this precise assembly creates a rigid assembly with recuded vibration compared to convention assemblies. The cylinder base 105 includes four bolting holes 109 to help secure the cylinder 24 to the drive shaft 16. The cylinder base 105 with the semi-circular indents 106, 108 allows for accurate, quick and easy assembly of the cylinder 24 with the drive assembly 34.

Figure 15:
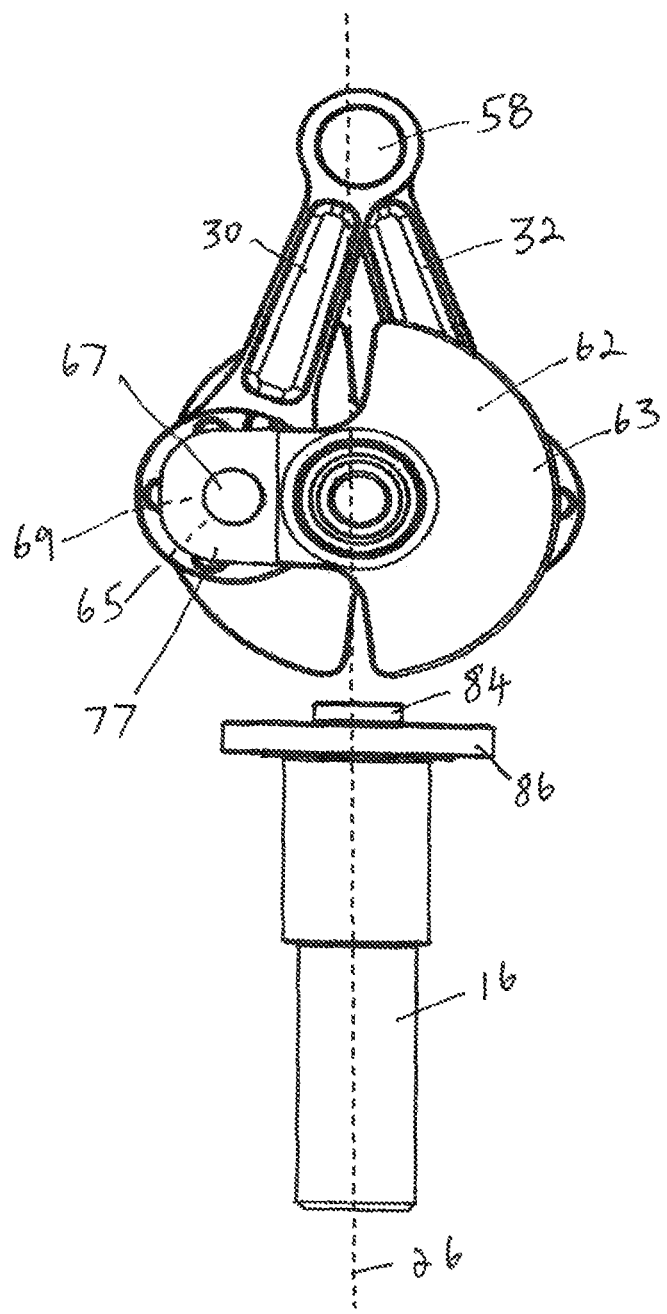
FIG. 15 is a simplified side view of showing a crankshaft and two connecting arms.
Figure 16:
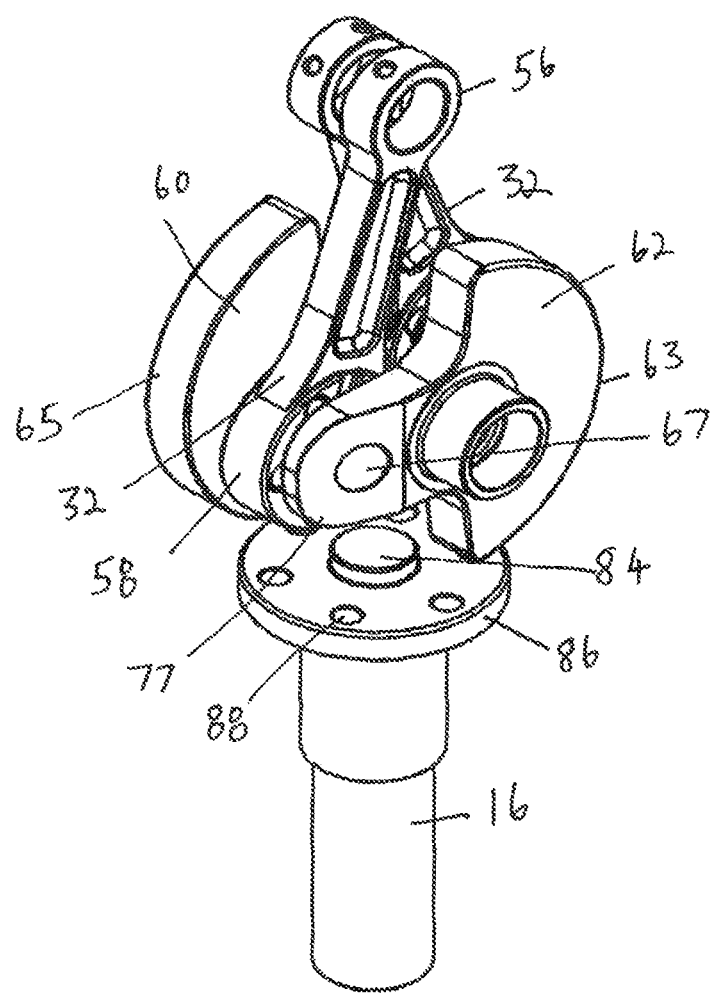
FIG. 16 is a simplified perspective view of FIG. 15.
Figure 17:
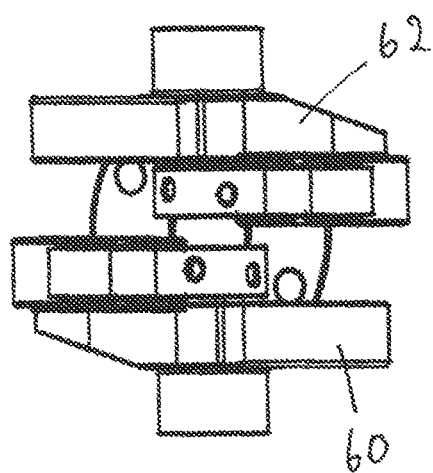
FIG. 17 is a simplified top view of FIG. 15.
Figure 18:
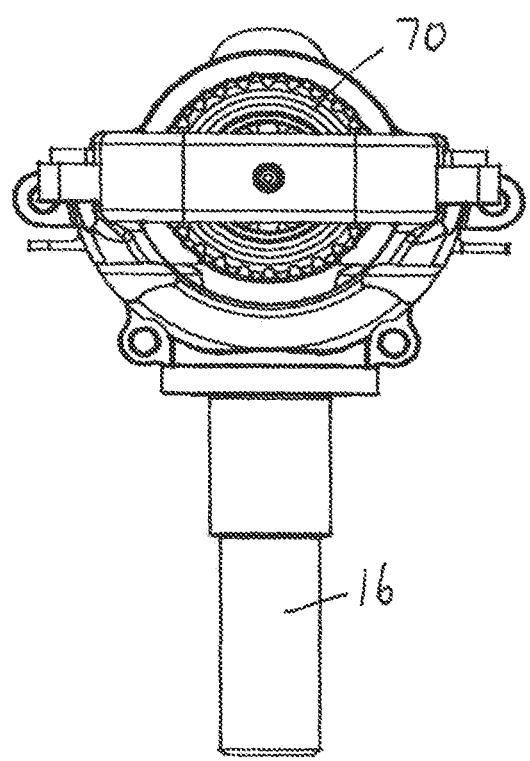
FIG. 18 is a side view of the gear assembly.
Figure 19:
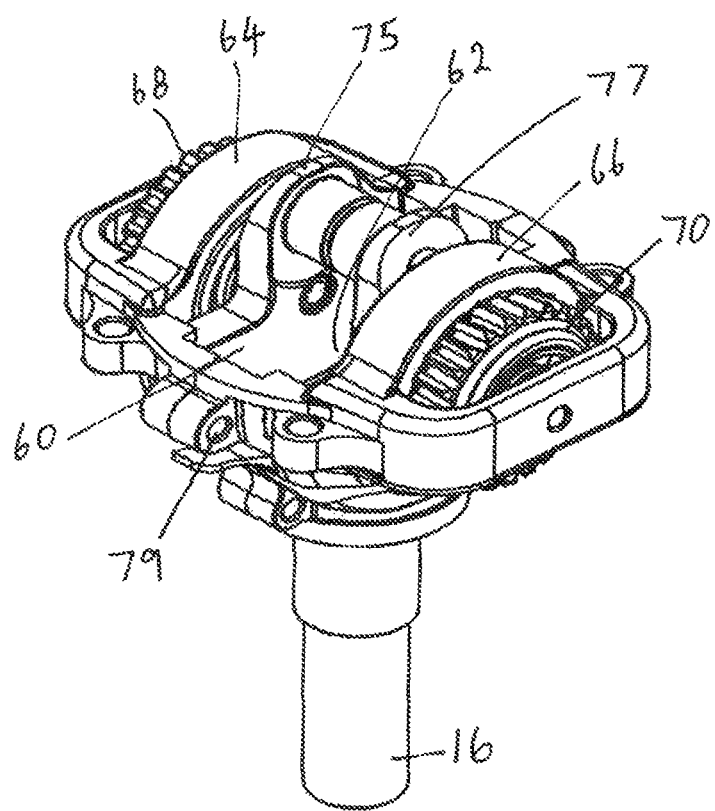
FIG. 19 is a perspective view of the gear assembly.
Figure 20:
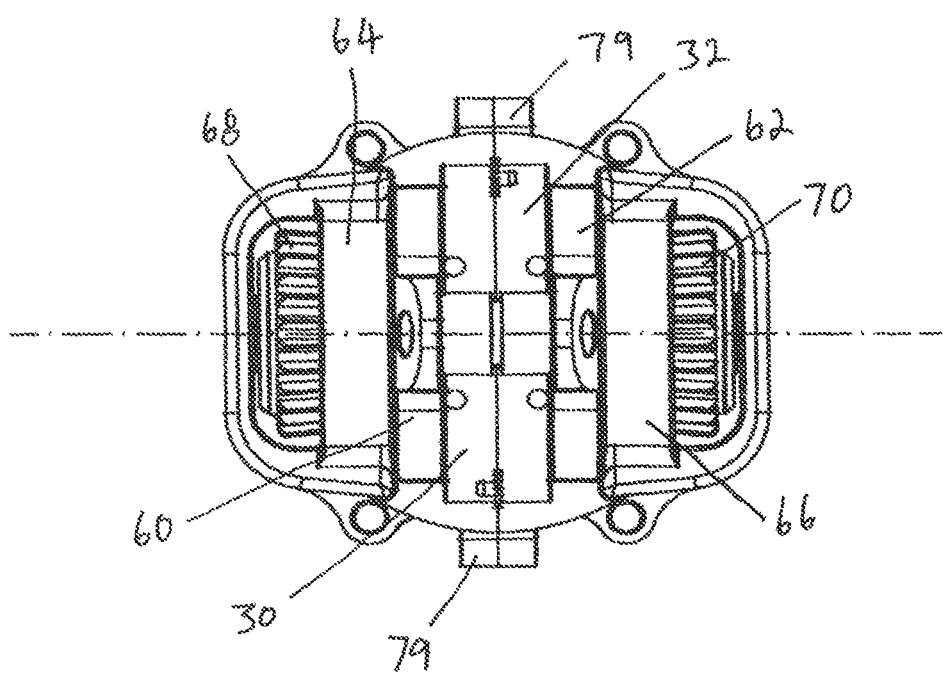
FIG. 20 is a top view of the gear assembly showing an axis of rotation
Figure 22:
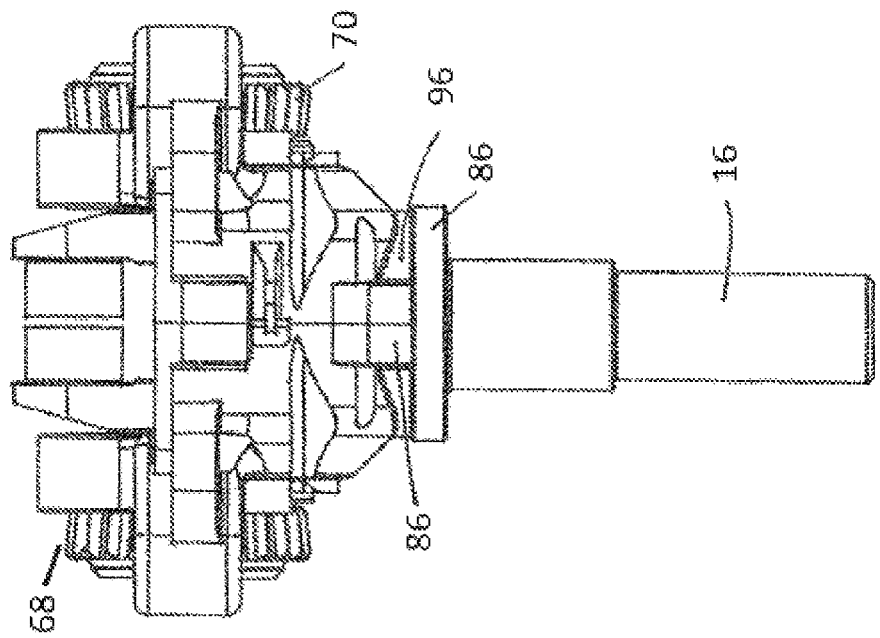
FIG. 22 is a side view of the gear assembly showing the location of the drive shaft.
Figure 21:
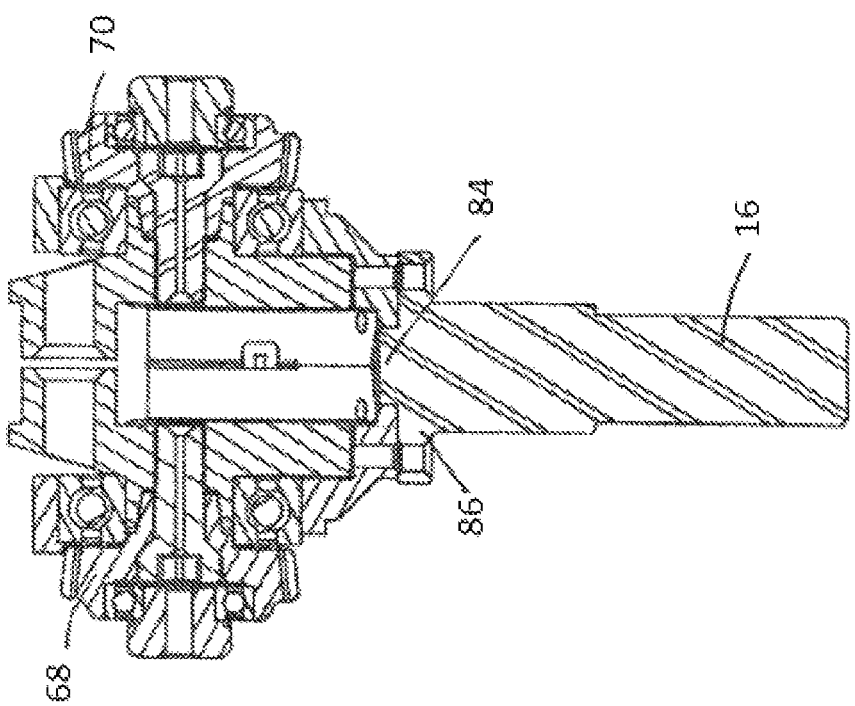
FIG. 21 is a longitudinal cross sectional detailed view of the gear assembly.

The connecting arms 30, 32 act individually and translate contra-rotation to the respective first and second crankshafts 60, 62. The rotary engine 10 with the piston 28 at a mid stroke position, as seen in FIGS. 11, 15, 15 and 16 with the connecting arms 30, 32 allow significant reduction of the side loading from the piston 28 and the wall of cylinder 24 because of the perfect symmetrical balance achieved. The piston 28 moves reciprocally within the cylinder 24. The piston 28 is carried through the agency of the piston pin 52 by the two connecting arms 30, 32 which extend from their respective throws or crank pins carried on the two separate and contra-rotating crankshafts. Each of the crankshafts carries the bevel gear pinion respectively, which meshes with the fixed bevel gear ring fixed.

3. The Cylinder Head Assembly

Referring now to FIGS. 4, and 34 to 45, a cylinder head assembly 109 is mounted on the upper cylinder portion 104 of the cylinder 24 so that the assembly 109 is connected to the cylinder 24 and the outer casing 14. The cylinder head assembly 109 includes the cylinder head 12 and a cylinder rotary disc 110. The cylinder rotary disc 110 is sealingly connected to the upper cylinder portion 104 and to an underside 112 of the cylinder head 12. The cylinder rotary disc 110 is therefore sandwiched between the cylinder head 12 and the cylinder 24. The diameter (and of course the circumference) of the cylinder head 12 when sealingly mounted on the cylinder 24 is larger than the diameter of the cylinder 24. Included around the periphery of the cylinder head 12 is a plurality of bolt holes 113 to receive bolts therein to secure the cylinder head 12 to the outer casing 14. The cylinder head 12 has a fluid (air) inlet port 114, a fluid outlet (exhaust) port 116, and an ignition source port 118. The ignition source port 118 houses an ignition source such as a spark plug (not shown). In the example shown, the fluid inlet port 114 is located adjacent the exhaust port 116. The cylinder rotary disc 110 includes a cylinder rotary disc opening 120, and a cylinder rotary disc ignition source port 122. The fluid ports 114, 116 in the cylinder head 12 are each sequentially registered with the cylinder rotary disc opening 120 as the cylinder 24 rotates within the outer casing 14.

Referring now to FIGS. 36 to 43, a sealing assembly is shown generally at 123. Three seal rings 124, 126, 128 are mounted in corresponding deep seal grooves 130, 132, 134 located adjacent the inlet port 114 and the exhaust port 116 in the cylinder head 12. An ignition port seal ring 136 is located in a seal groove 138 located around the ignition source port 122. The seal rings 124, 126, 128 are equidistant from each other and are located around the ignition port seal ring 136. The underside 112 of the cylinder head 12 also includes first and second concentric grooves 138, 140, the second groove 140 being smaller than the first groove 138. Located between the two concentric grooves 138, 140 is a plurality of spaced apart air flow openings 142, the air flow openings 142 being concentric with the second groove 140.

Figure 38:
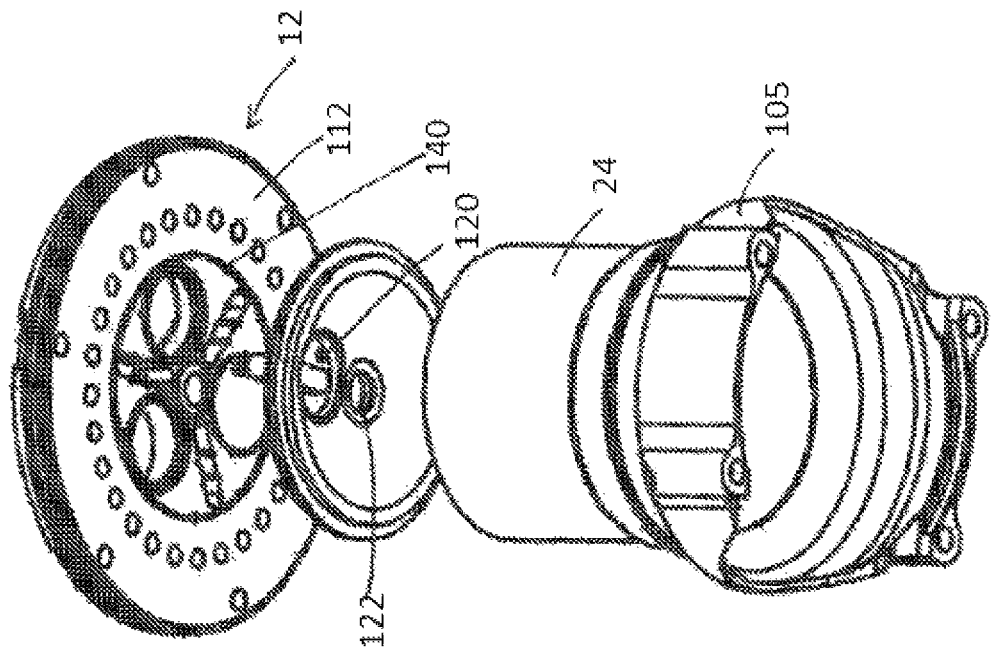
FIG. 38 is an exploded bottom perspective view of FIG. 36.
Figure 37:
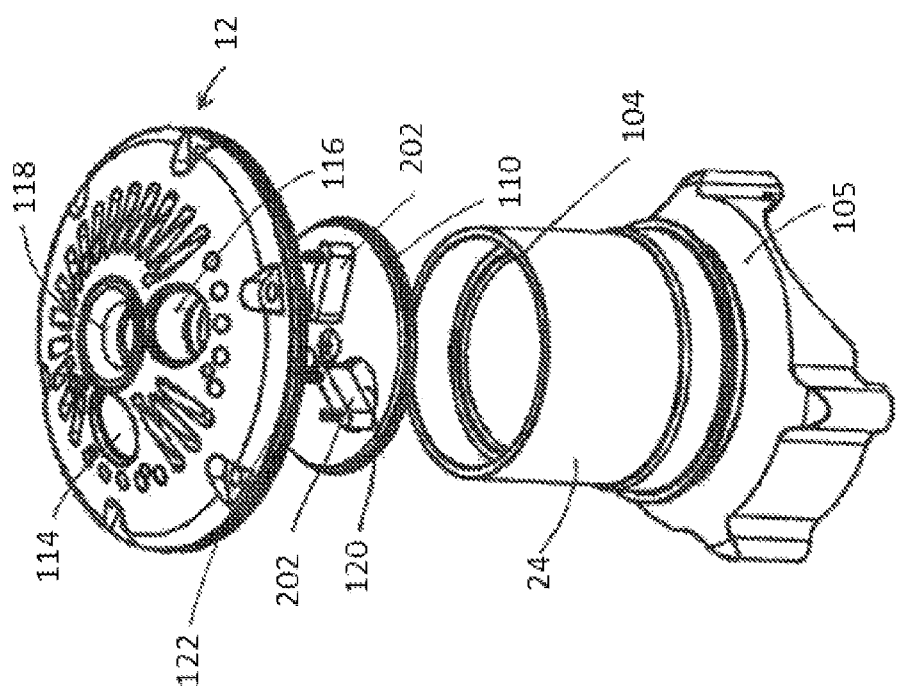
FIG. 37 is an exploded perspective view of FIG. 36.
Figure 39:
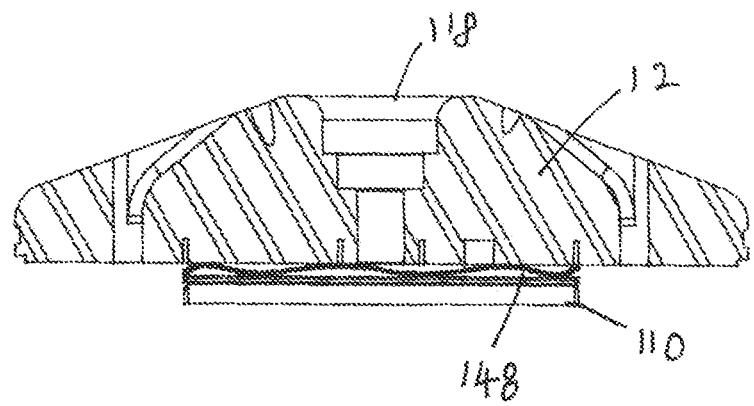
FIG. 39 is a longitudinal cross sectional view of the cylinder head
Figure 40:
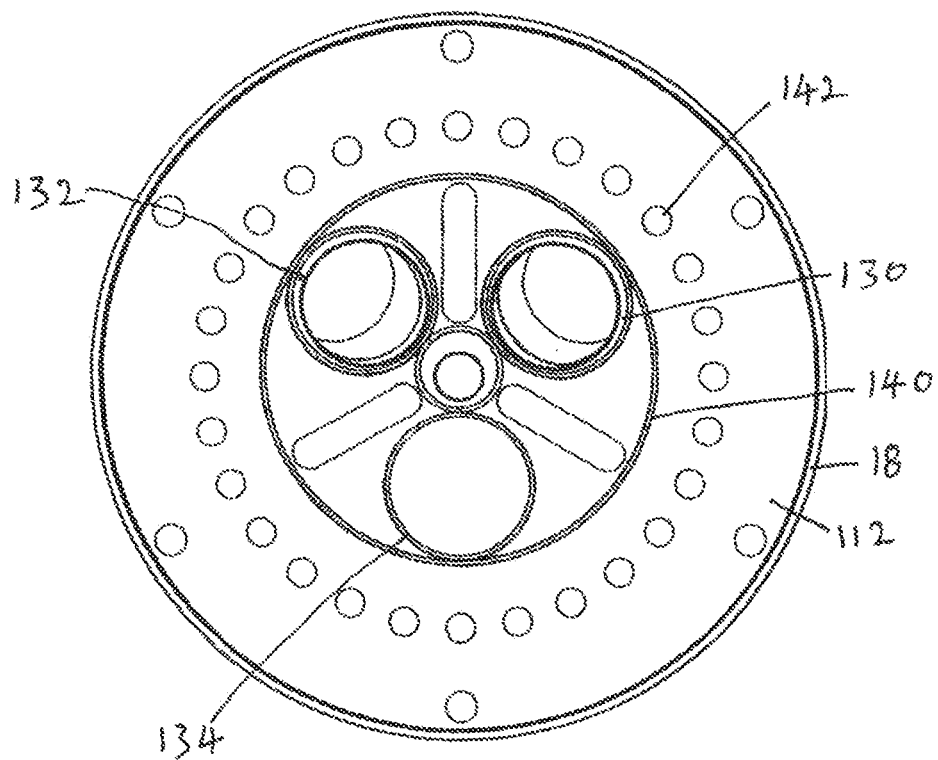
FIG. 40 is a bottom view of FIG. 39.
Figure 41:
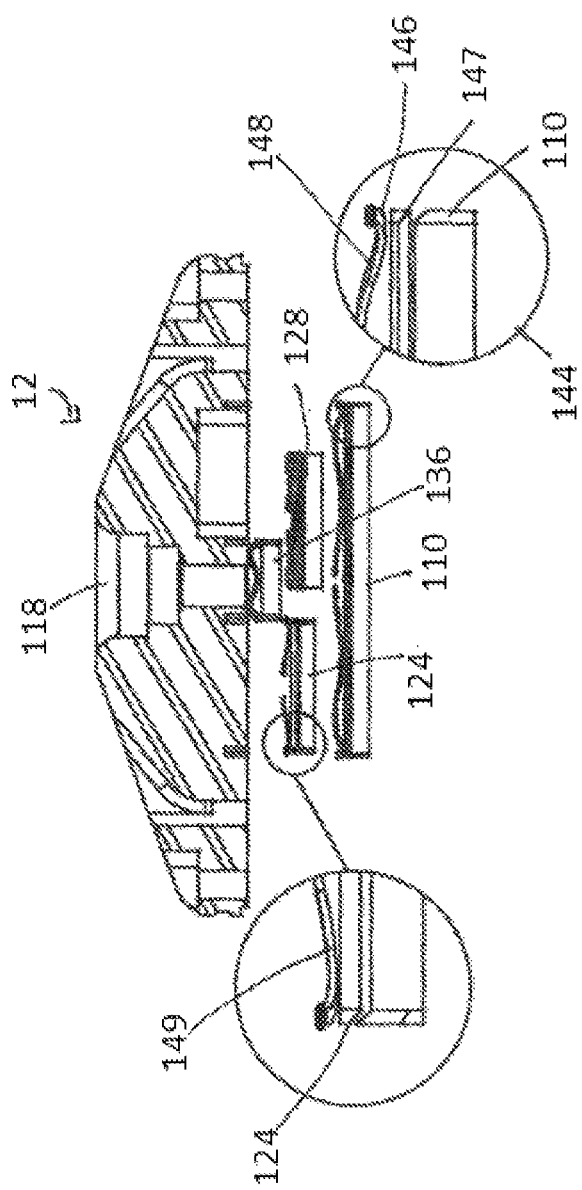
FIG. 41 is an exploded longitudinal side view of the cylinder head showing detailed views of the ring seals
Figure 42:
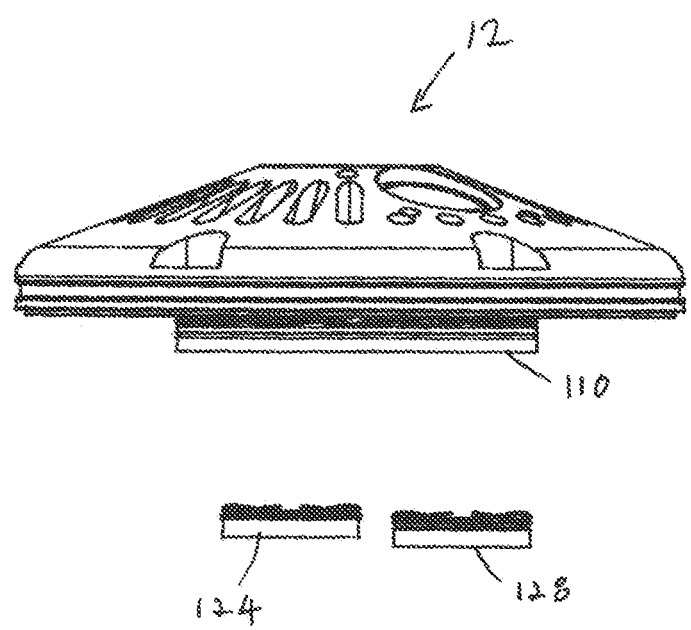
FIG. 42 is a exploded detailed side view of the cylinder head.
Figure 43:
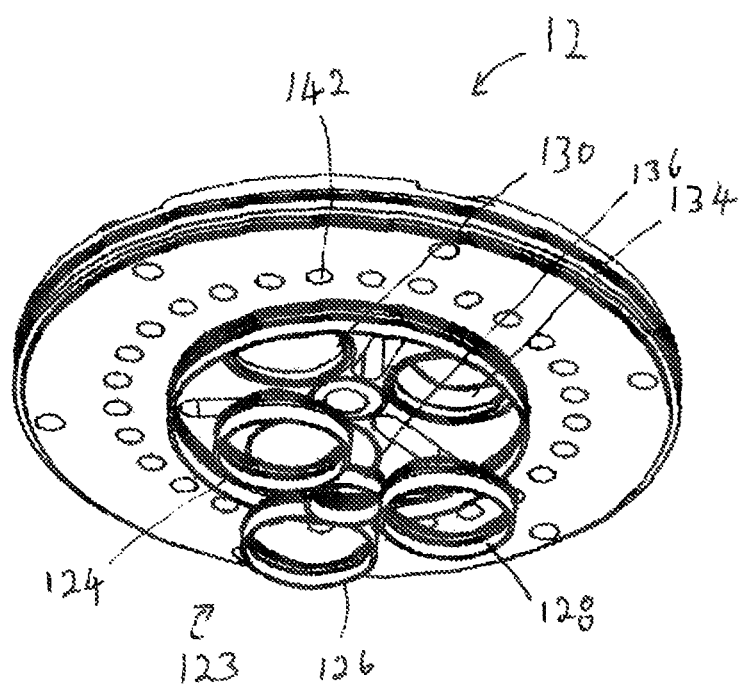
FIG. 43 is a partially exploded bottom perspective view of the cylinder head.
Figure 45:
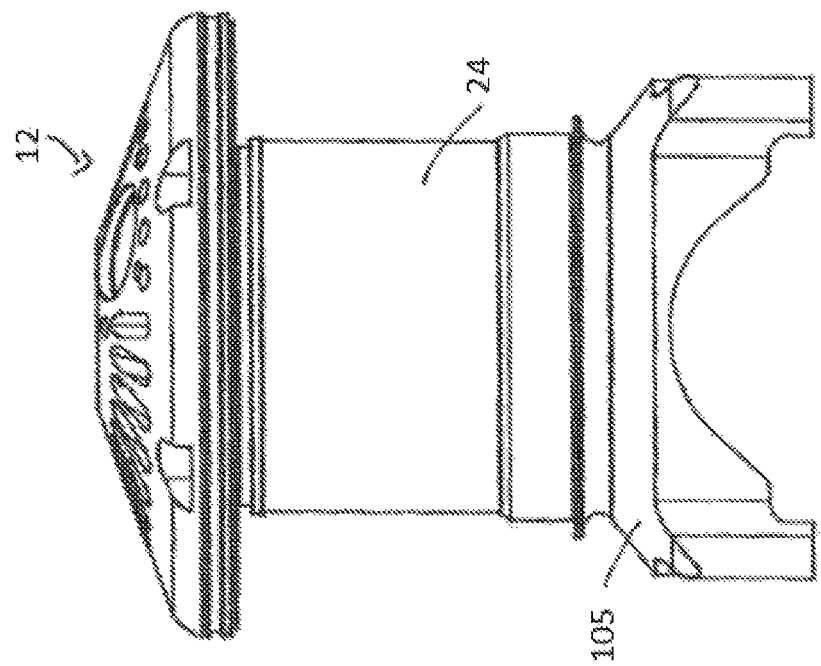
FIG. 45 is a side view of the assembled cylinder head and the cylinder.

As best seen in FIGS. 37 and 38, the cylinder rotary disc 110 has a circumferentially disposed seal 144 that fits snuggly in the deep second groove 140 and allows a sealing engagement with the upper cylinder portion 104. The seal 144 also includes a backup ring seal 146 with cut at at least one location 147 and is located outside the second groove 140. Resilient wave springs 148 are mounted on top of the cylinder rotary disc 110. Each of the seal rings 124, 126, 128, 136 do not have a cut, but instead include a back up ring 149 located on the inside of the seal grooves 130, 132, 134. The outer surface of the ring seals 124, 126, 128, 136 are chamfered at the upper and lower ends (not shown). The ring seal designs are part of a high pressure rotary valve in which the resilient wave springs 148 provide a light downward force; the backup ring seal 149 with the cut at at least one location 147 seals on the diameter of the seal groove; the seal rings 124, 126, 128 push downwardly on the outside of the respective grooves; the medium sized ring push downwardly on the inside of the groove; and the main rings 124, 126, 128 are chamfered so that they fit the backup ring better without needing a cut. The ring seals seal in different directions to provide a perfect seal. Thus, the three ring set is fixed with the head rotary top cylinder.

3. The Cooling System

In addition to the engine structure, the ability to cool the engine during operation is advantageous. A dual unique fan and thermal energy exchange system is located opposite the drive assembly 34 to provide very efficient self cooling using air flow and thermal contact to exchange heat to the air as cool, fresh air moves across the thermal exchange surfaces. The ability to efficiently remove heat from the engine prevents engine overheating, which can ultimately cause engine failure.

Figure 34:
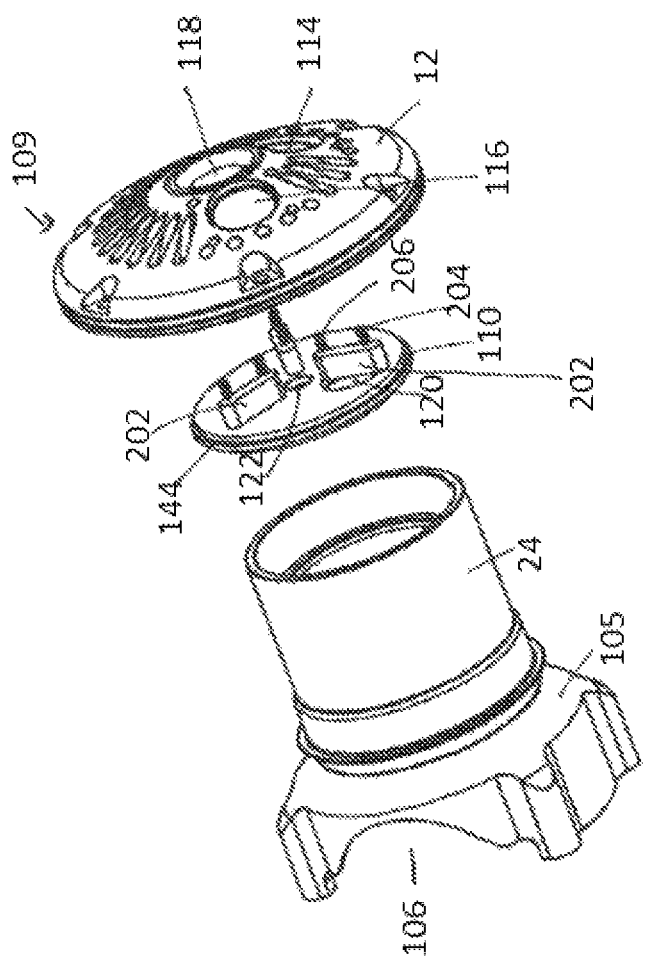
FIG. 34 is an exploded perspective view of a cylinder head and cylinder.
Figure 36:
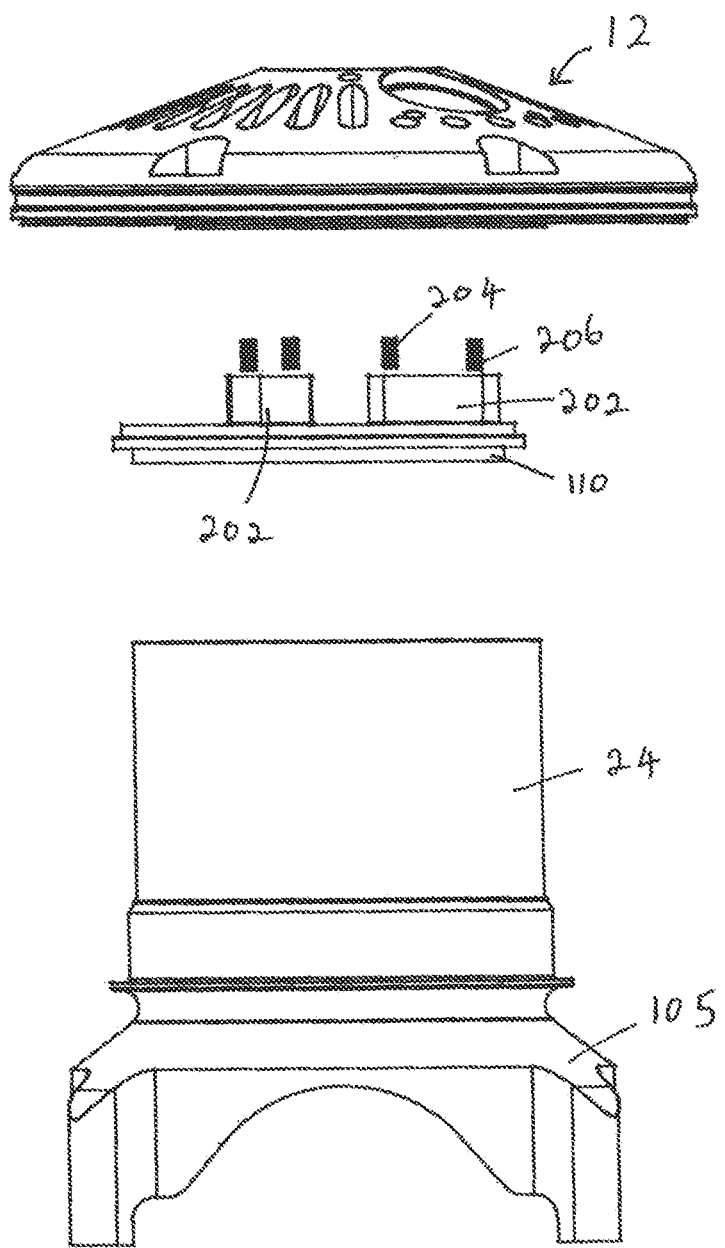
FIG. 36 is an exploded side view of the cylinder head and cylinder.
Figure 44:
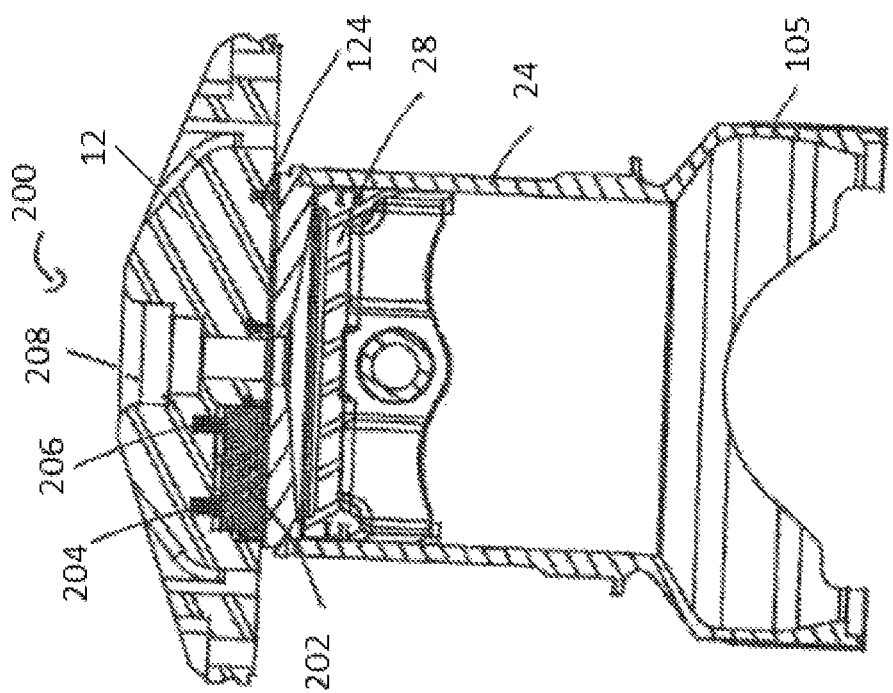
FIG. 44 is a longitudinal cross sectional view of the cylinder head and cylinder showing a thermal pad.
Figure 46:
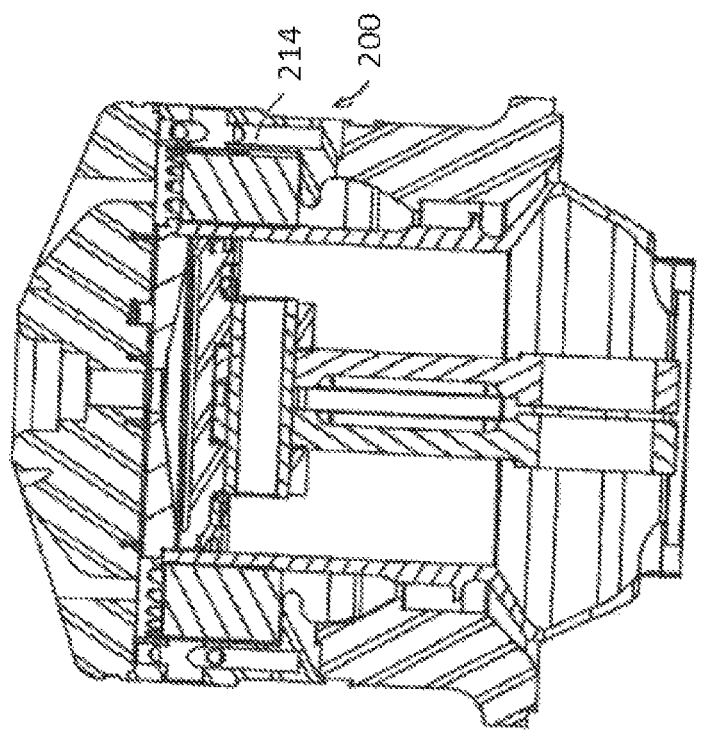
FIG. 46 a longitudinal cross sectional view of FIG. 45.

Referring now to FIGS. 2, 34, and 44 to 59 a dual cooling system is illustrated generally at 200. The first part of the dual cooling system 200 relies on thermal energy transfer from a hot surface to cool air as the cool air is forced across the hot surface. The second part of the dual cooling system 200 relies on thermal transfer from a hot surface via a heat exchanger. As best seen in FIG. 34, three heat transfer pads 202 spaced apart and equidistant from each other and connected to the cylinder rotary disc 110. The heat transfer pads 202 are upstanding from the cylinder rotary disc 110. The three heat transfer pads 202 act as independent heat exchangers to remove heat from the engine. The heat transfer pads 202 radiate away from the cylinder rotary disc ignition source port 122 and are angled away from each other at about 120 degrees. As best seen in FIG. 44, each of the heat transfer pads 202 includes two light resilient spaced apart (spring) members 204, 206 extending upwardly therefrom. Each of the heat transfer pads 202 and the spaced apart spring members 204, 206 insert snuggly into a cylinder head cavity 208. The thermal energy produced during combustion of the fuel and operation of the rotary engine 10 generates considerable thermal energy in the form of heat. Given that the heat transfer pad 202 are located adjacent to or in direct contact with the thermal surfaces of the cylinder 24 means that they are able to absorb the thermal energy and transfer it to the cylinder head 12 for dissipation directly from the outer surfaces of the cylinder head 12 or by cool air flowing over the outer surfaces. The thermal transfer pads 202 are made from material which have a high heat conductivity are which are well known to hose skilled in the art.

Figure 47:
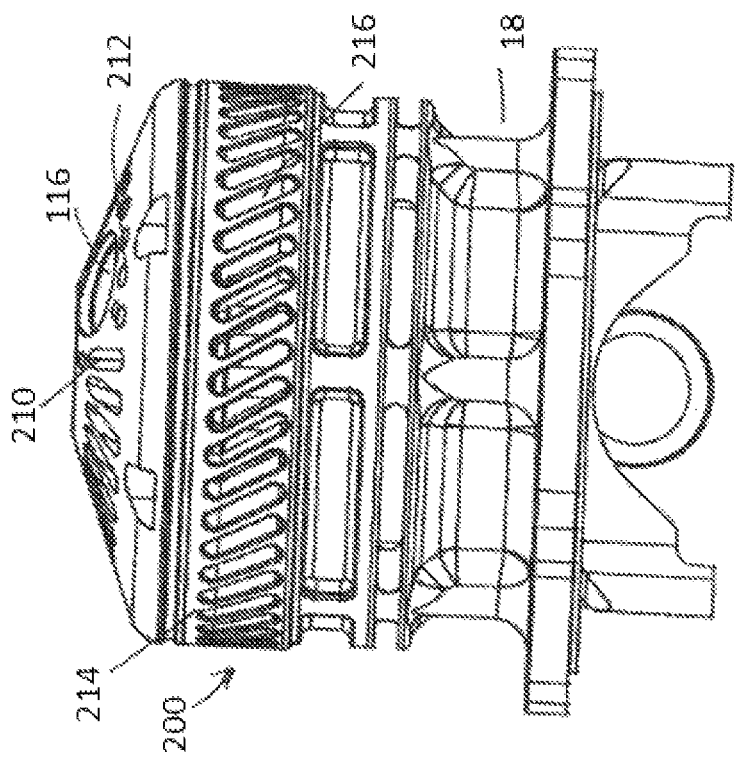
FIG. 47 is a detailed side view of the cylinder head showing a collar with a plurality of angled air flow openings.
Figure 48:
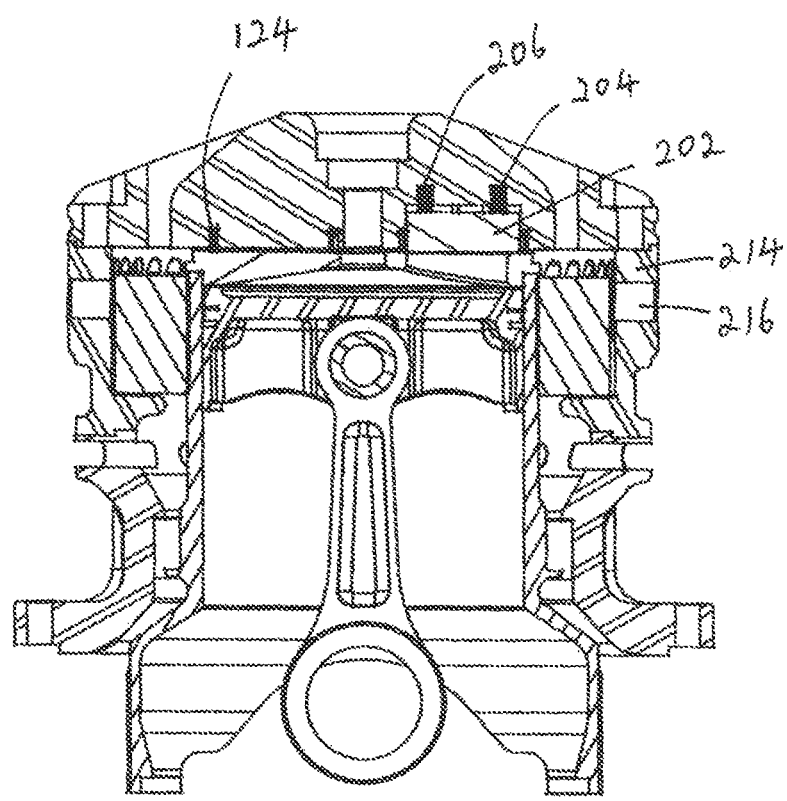
FIG. 48 is a longitudinal cross sectional view of FIG. 47.
Figure 49:
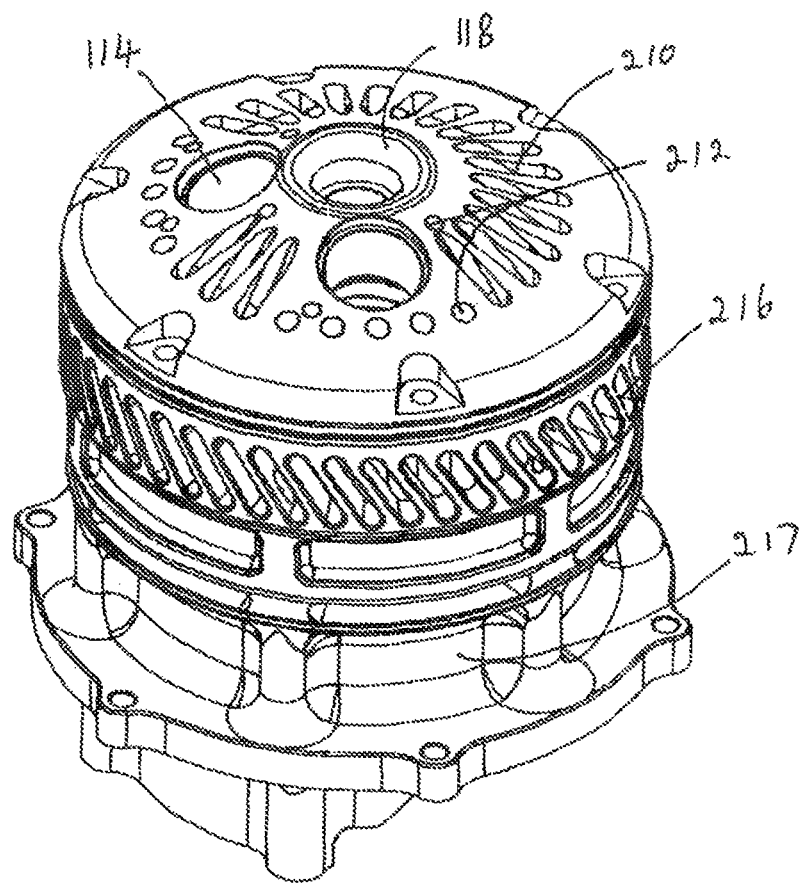
FIG. 49 is a perspective view of the assembled cylinder head.

Still referring to FIGS. 1 and 2, and now FIGS. 47 and 49, a collar 214 is connected between the cylinder head 12 and the upper part 54 of the base body section 20. The collar 214 includes a plurality of spaced apart, angled elongate openings 216 arranged as part of a dual cooling system, which will be described in more detail below. Below the collar 214 are a plurality of horizontally disposed indents 217 which help to reduce the overall weight of the engine. Below the indents 217, of which there are six, are a plurality of air inlet opening 221.

Turning now to the second dual cooling system which operates in concert with the first of the dual cooling systems. As mentioned above, the cylinder head 12 includes the plurality of spaced apart air flow openings 142 which are located equidistant between the seals 138, 140 in the cylinder head 12 part of an air flow cooling system. Located on the top part of the cylinder head 12 are a plurality of radially disposed elongate cooling air intake openings 210 adjacent a plurality of air inlet openings 212 that are disposed about the ignition source port 118 and radiate outwardly therefrom. Each of the openings 210 are small elongate openings arranged in groups of three around the cylinder head 12.

Figure 50:
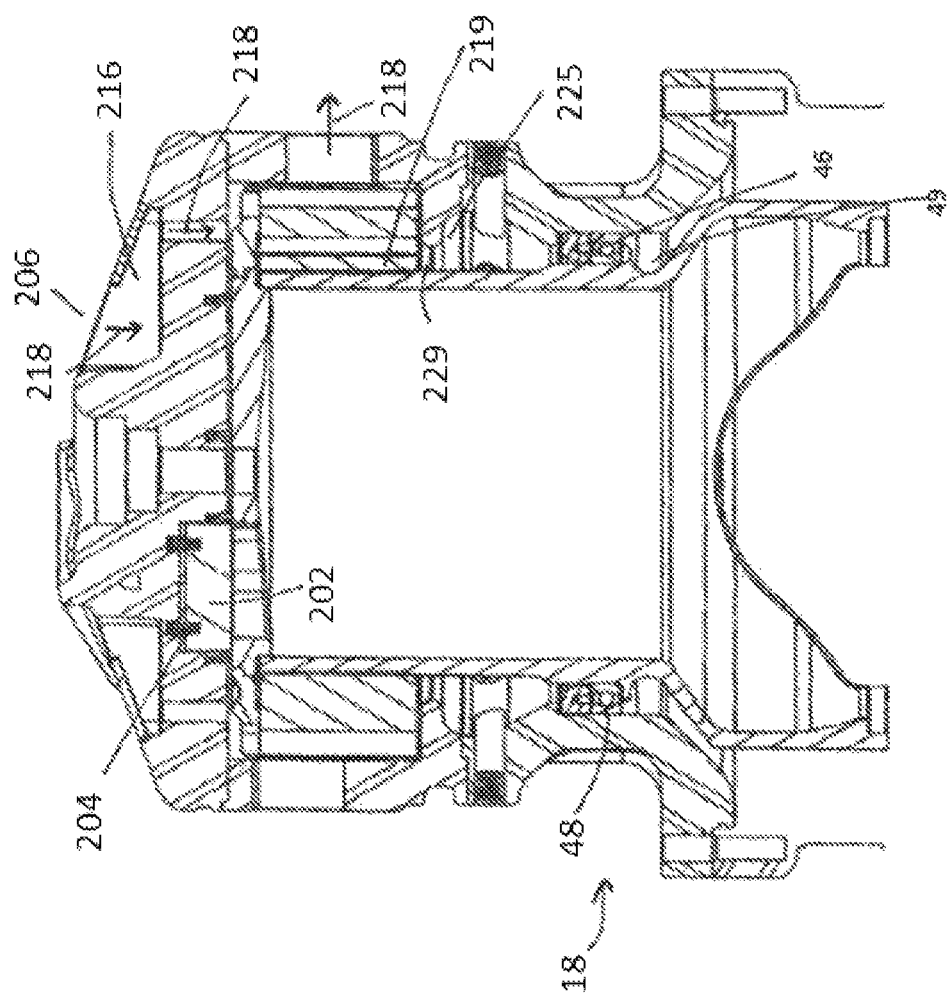
FIG. 50 is a longitudinal cross sectional view of the cylinder head showing an air flow pathway (arrows)
Figure 52:
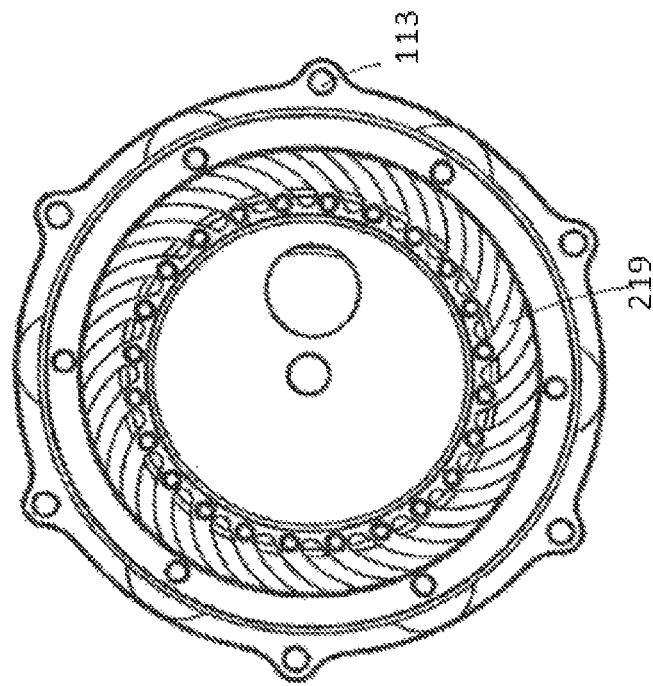
FIG. 52 is a top view of the cylinder head showing the location of the rotating cooling fins.
Figure 51:
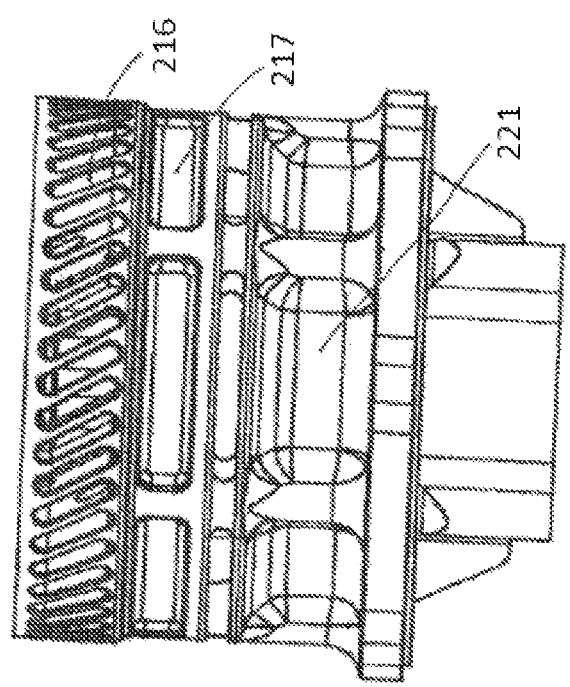
FIG. 51 is a simplified side view of the cylinder head and collar showing the location of the angled air flow openings.
Figure 54:
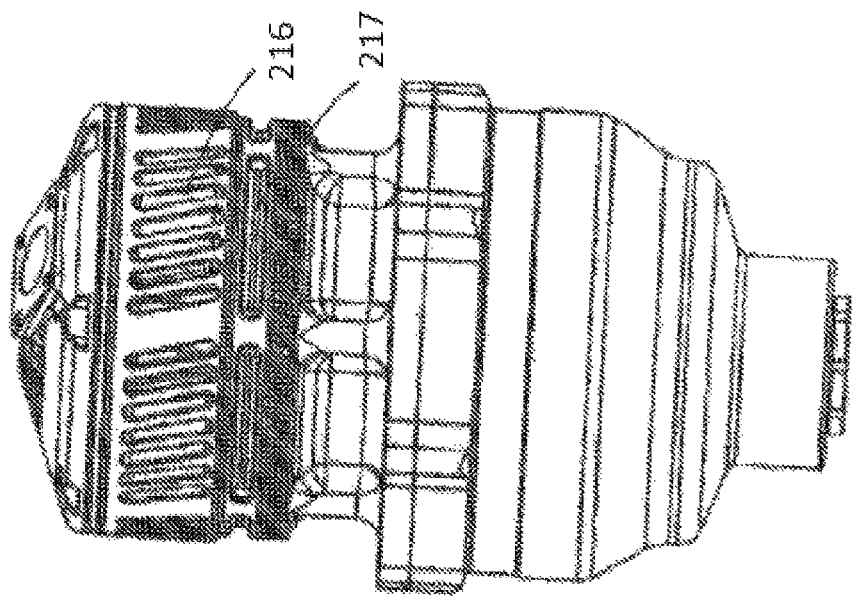
FIG. 54 is a side view of FIG. 53.
Figure 53:
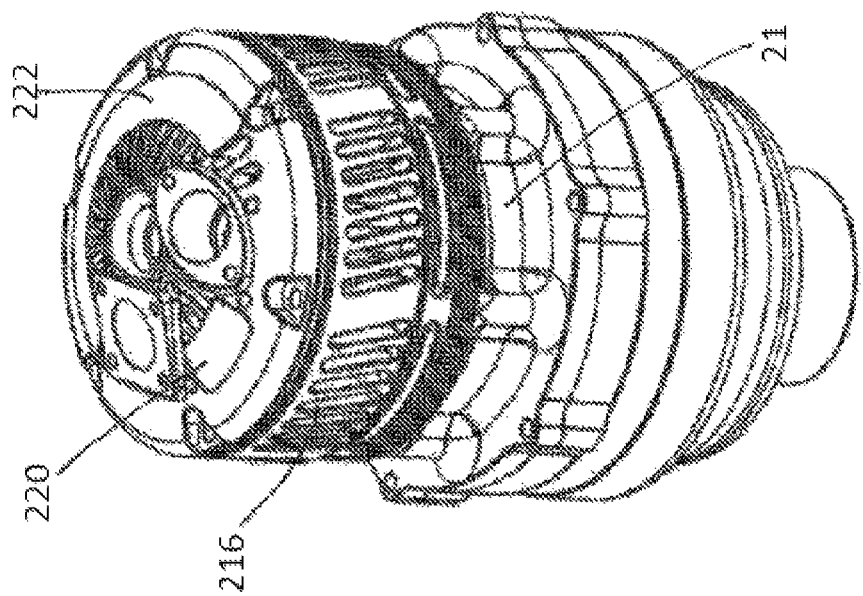
FIG. 53 is a perspective view of a fully assembled rotary engine showing the location of deflector caps.
Figure 55:
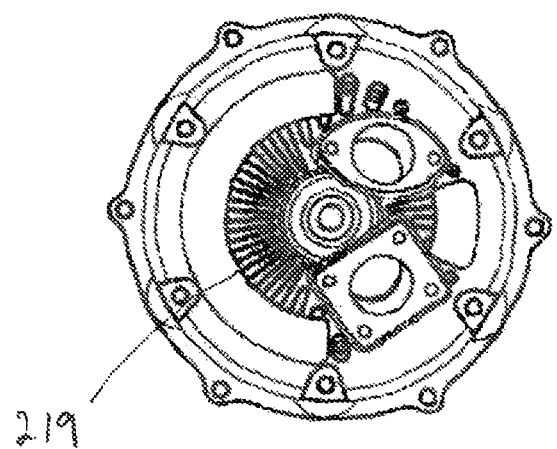
FIG. 55 is a top view of FIG. 53.

As best seen in FIGS. 49 and 50, the collar 214 is connected between the cylinder head 12 and the upper portion of the outer casing. The collar 214 includes the plurality of spaced apart, angled elongate openings 216. The openings 216 provide an outlet for air flow as it passes along a coolant flow pathway 218 (as indicated by the arrows in FIG. 50). A fan 219 is mounted to rotate around the cylinder 24 to draw fresh air in through the inlets 210, 212 and 225. The deflector located adjacent the inlet 225 pushes air onto the small diameter of the fan 219, and then the warmed air exits through the opening 216. The fan 219 is made from lightweight aluminum and is screwed into the top of the cylinder disc and the top of the cylinder disc to the cylinder. First and second deflector caps 220, 222 are connected to the top of the cylinder head 12 and are located adjacent the intake fins 210. In operation, as the cylinder rotates, air is drawn in from around the cylinder head 12 and enters the plurality of air inlet openings 210 and the openings 212 is forced into the coolant flow pathway 218. The rotating fins push the air out through the angled elongate openings 216. As the air flows along the passageway 218 thermal energy transfer takes place from the hot surfaces in the cylinder head 12 or adjacent to it to the cool air which absorbs the heat. The forcing of air from the center of the cylinder head 12 then through the cylinder head provides superior cooling efficiency compared to conventional cooling methods.

Figure 57:
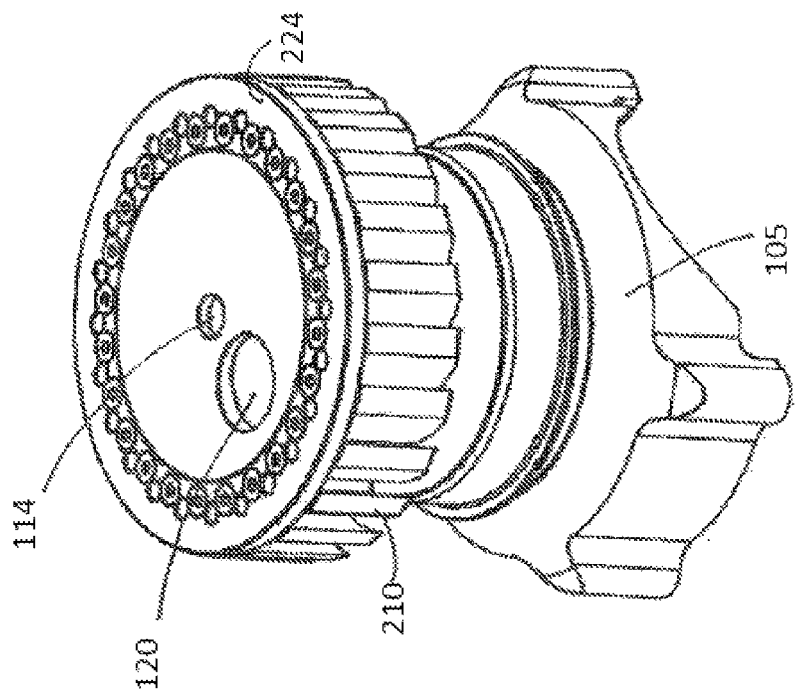
FIG. 57 is a perspective view of FIG. 56.
Figure 56:
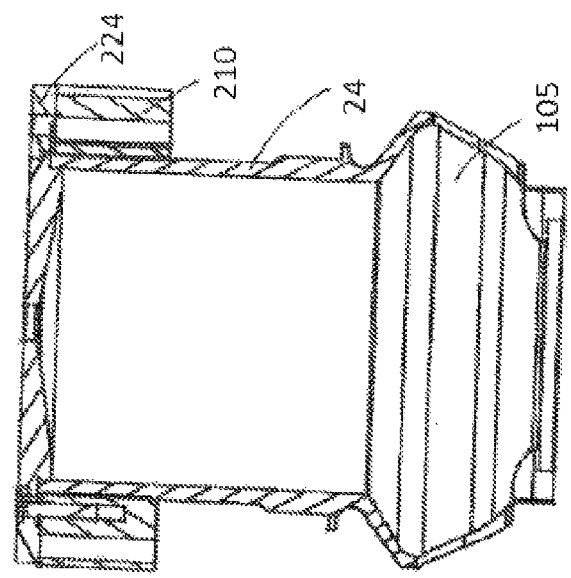
FIG. 56 is a simplified longitudinal cross sectional view of the cylinder showing the location of the cylinder cap.
Figure 58:
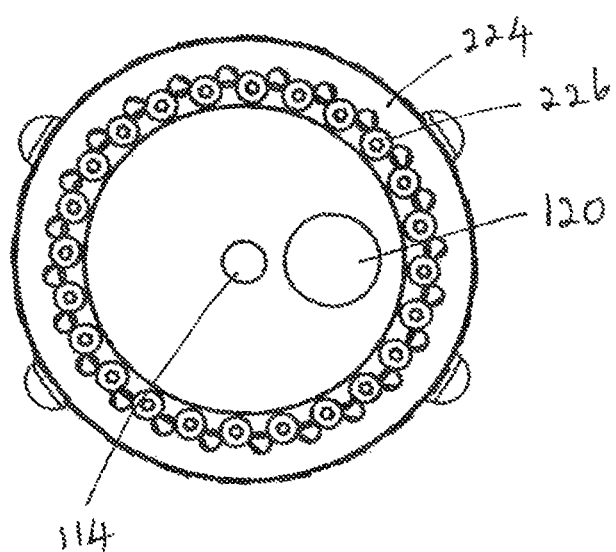
FIG. 58 is top view of FIG. 57.
Figure 60:
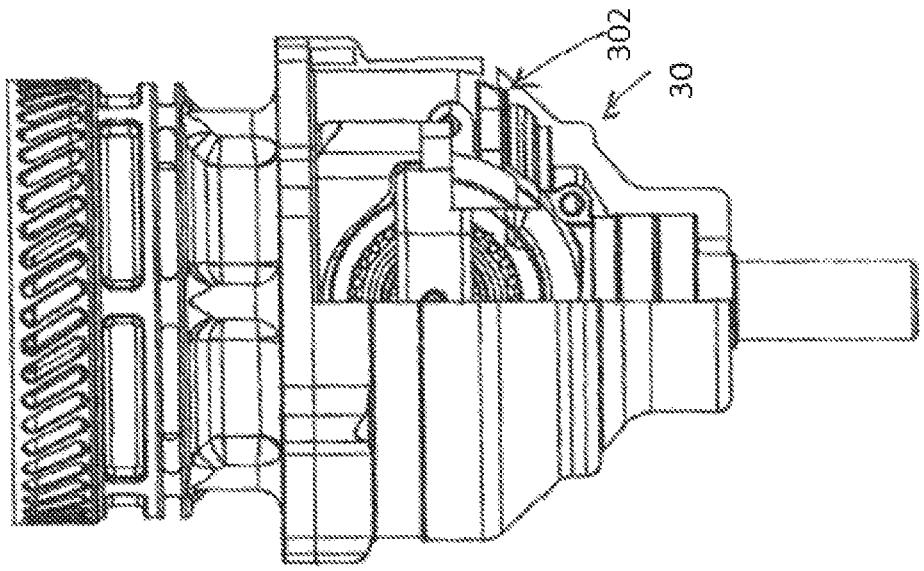
FIG. 60 is a partial cut away side view of the engine showing an oil inlet.

Referring now to FIGS. 56 to 58, a locking disk 224 is mounted on top of the cylinder and surrounds the cylinder rotary disc 110 using a plurality of locking bolts 226 (locking disk with the fin rings). The plurality of holes 14 communicate from the cylinder head 12 to the fins 219 providing cooling to the cylinder head 12.

Referring back now to FIG. 52, when viewed from above, the fins on the rotary cooling fan are angled towards the spark plug hole. Also, when viewed from above, a plurality of circumferentially disposed bolt holes 113 are located top help secured the cylinder head to the outer casing.

In sum, cool fresh air is drawn into the cylinder head 12 at the openings 210, 212, and 225. The deflectors brings cooling flow to the small diameter of the rotary fins 219. The intake is through the cylinder head 12 to the small diameter of the fins 219. Exit air flows to cool off the body of the engine. The fixed fins on the cylinder head also aid cooling.

4. Lubrication System

As with any machine having moving parts, a lubrication system is needed to allow the parts movement across each other's surfaces to prevent ceasing. In my new rotary engine, I have designed a lubrication system which permits efficient movement of the parts without the need for a sophisticated sealing arrangement and which considerably reduces the frequency of required lubricant replacement. The lubricant used is a typical oil (synthetic or natural) known to those skilled in the art for the purpose of lubrication.

Figure 59:
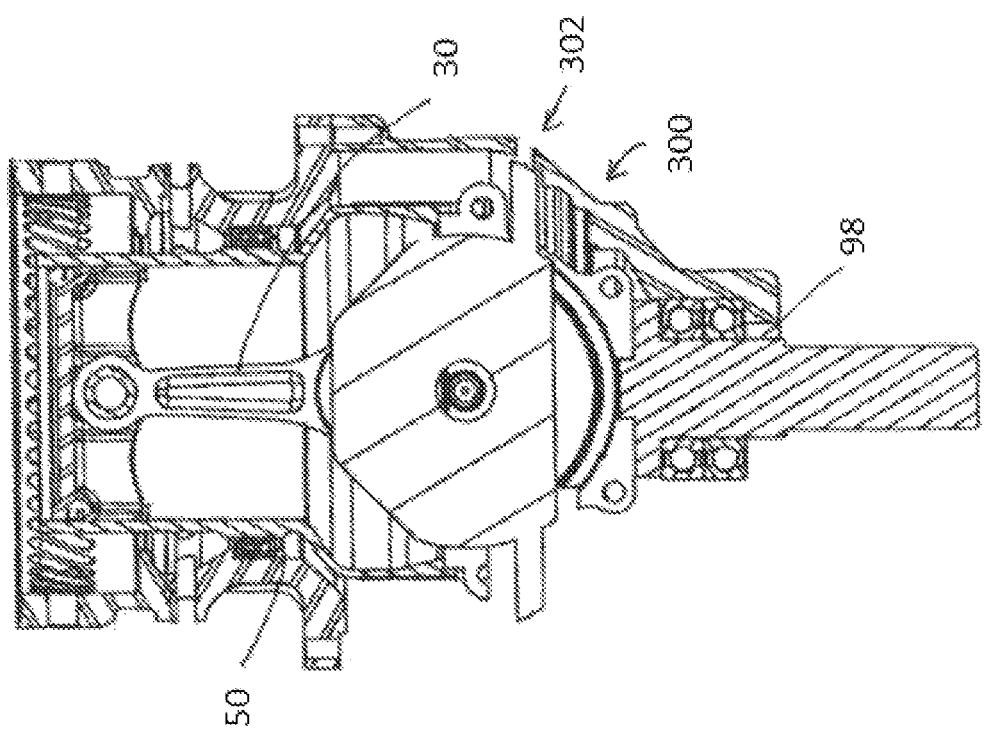
FIG. 59 is longitudinal cross sectional view of the rotary engine showing location of seals and an oil lubrication system.
Figure 62:
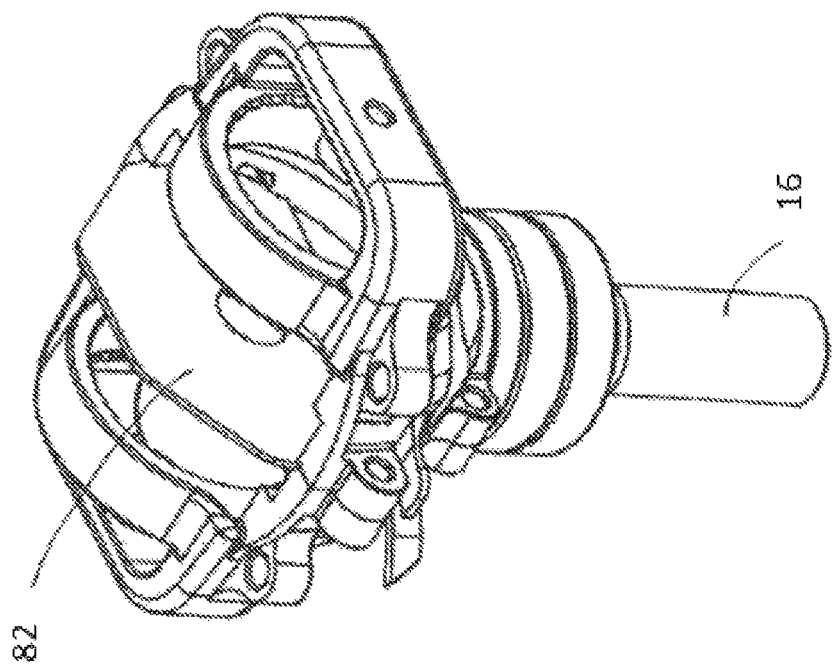
FIG. 62 is a simplified perspective view of the drive assembly showing the spacer bar.
Figure 61:
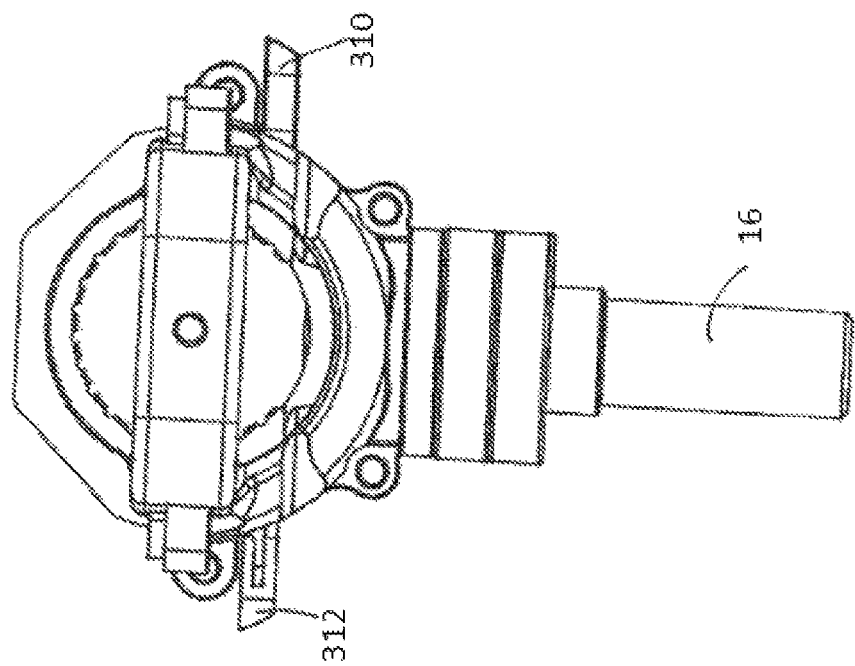
FIG. 61 is aside view of the drive assembly showing two spacer rod supports.
Figure 64:
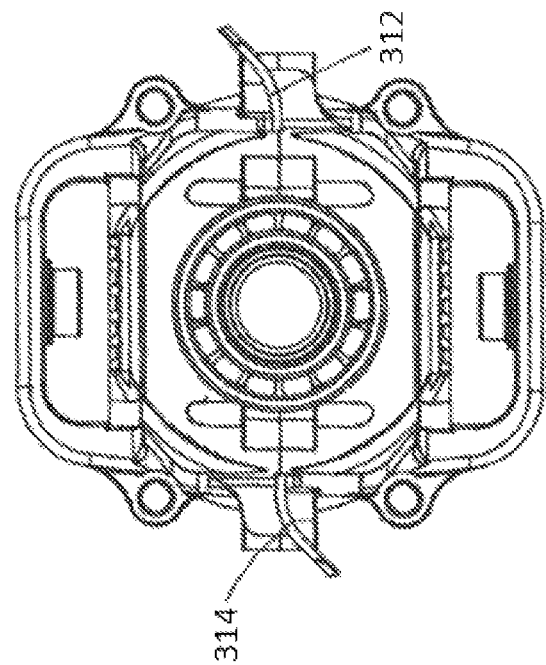
FIG. 64 is a bottom view of the drive assembly showing the location of the two supports
Figure 63:
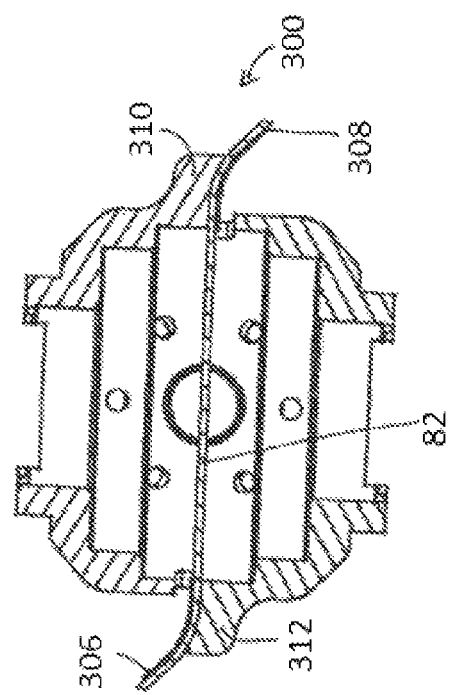
FIG. 63 is a simplified top view of the spacer bar showing two curved ends abuting the two spacers.
Figure 65:
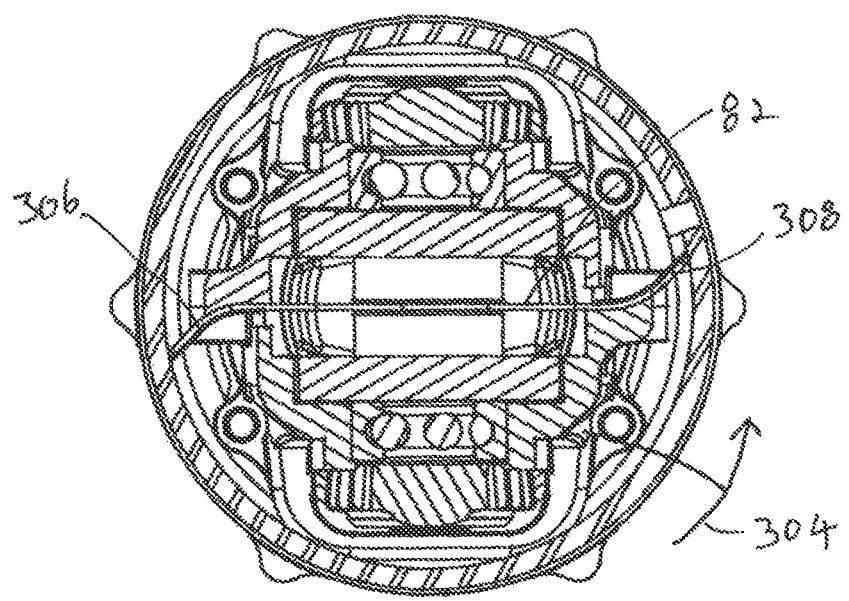
FIG. 65 is a detailed top view of the drive assembly showing the spacer rod, the two curved ends and the direction of rotation.
Figure 66:
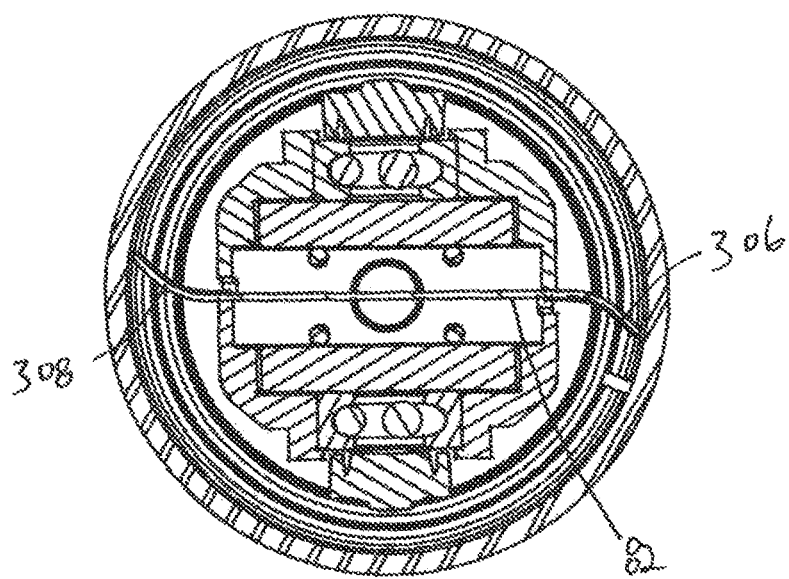
FIG. 66 is another top view of the drive assembly showing the location of the curved ends after 180 degree rotation.

Referring now to FIGS. 59 to 66, a lubrication system is shown generally at 300. An oil inlet port 302 is shown adjacent the gear assembly and is connected to an oil pump (not shown). The spacer rod 82 between the two connecting arms 30, 32 has two curves 306, 308 at either end towards the outer casing so that the oil entering the gear assembly is induced to the middle of the engine as the engine rotates in the direction of an arrow 304. This simple curvature of the spacer rod 82 allows for a more even distribution of the oil to all the moving parts during operation of the engine. Absent the rod spacer curvatures 306, 308, the oil's final destination would depend largely on the pump force. An oil outlet port (not shown) ensures continuous recycling of the oil. The seals 50, 98 between the cylinder 24 and the outer casing 14 and between the lower base portion and the drive shaft 16 prevent the oil from leaking out from the engine. The curved ends 306, 308 of the spacer rod 82 abut two supports 310, 312 which project outwardly from the engine 10. As best seen in FIG. 59, the cylinder 24 and the gear assembly 34 is a closed system, which maintains oil so that it remain in contact with the rotary parts. The oil inlet port 302 moves the oil to the base body which is induced by the rod spacer 82.

Operation

An operation of the rotary engine 10 will now be described in detail. The balanced rotary engine 10 provides a rotational force (torque) to the drive shaft 16, which when coupled to a load of some description is able to efficiently move that load. In the case of an automobile, the rotational power is used to rotate wheel axles causing the vehicle to move forward or rearwards. A fuel supply, such as gasoline or diesel, would be coupled to the cylinder head 12 (valving block) via an appropriate fuel distributor, such as a carburetor. An ignition source such as a spark plug (not shown) is provided to initiate ignition of the fuel. When ignition occurs, sufficient explosive force is generated to drive the piston 28 longitudinally along the first longitudinal axis 26 within the cylinder 24. In so doing the first and second crankshafts 60, 62 are caused to rotate synchronously in opposite directions by the downward thrust of the piston 28 on the connecting arms 30, 32. The rotation of the crankshafts 60, 62 triggers rotation of the beveled pinion gears 68, 70, which contra-rotate about the second axis of rotation 76, and through the meshing engagement with the static fixed beveled gear ring 100, the piston 28 and the cylinder 24 together with the other moving parts rotate about the cylinder first longitudinal axis 26. The drive assembly 34 rotates the drive shaft 16 to transmit drive to the working load (not shown). The contra-rotation of the connecting arms 30, 32 provides a balanced power transmission that minimizes vibration and therefore noise generation. All components illustrated in FIGS. 4 and 5 rotate about the first cylinder longitudinal axis 26 during operation of the engine 10. As a result of this, the fuel economy is advantageously improved.

A person skilled in the art will readily understand that other designs can be used in which more than a single cylinder is used. With the new rotary engine described above, the same balanced loading that is achieved with the single cylinder would be maintained with multiple cylinders. Furthermore, since the new rotary engine is modular, a plurality of the engines could be assembled in a suitable series or parallel arrangement to provide power for a particular application.

Other Embodiments

From the foregoing description, it will be apparent to one of ordinary skill in the art that variations and modifications may be made to the embodiments described herein to adapt it to various usages and conditions.

I claim:

1. A balanced rotary engine for applying torque to a drive shaft, the rotary engine comprising:
   an outer casing having a main drive case;
   a cylinder rotatably mounted in the outer casing;
   a piston mounted for longitudinal movement within the cylinder;
   a drive assembly having:
   i) a first connecting arm and a second connecting arm, each connecting arm having a first connecting end and a second connecting end, the first connecting ends being connected to the piston;
   ii) a first crankshaft and a second crankshaft, each crankshaft being rotatably connected to the second connecting end of the connecting arms;
   iii) a first drive wheel and a second drive wheel contra-rotatably connected to the respective first and second crankshafts; and
   iv) a fixed drive ring being located between the first and second drive wheels and the drive shaft and having a circumferentially disposed drive member surface, the fixed drive ring being mounted in the main drive case so that the drive member surface is disposed towards the piston, the first and second drive wheels meshing with the drive ring;

the drive shaft being connected to the drive assembly and extending away therefrom.

2. The rotary engine, according to claim 1, in which the cylinder has a chamber with a first longitudinal axis and a cylinder base, the cylinder base having first and second semi-circular indents located opposite each other, the cylinder base being sized and shaped for cooperation with the drive assembly.

3. The rotary engine, according to claim 2, in which the cylinder has a cylinder circumference, and the cylinder base having a cylinder base circumference, the cylinder base circumference being greater than the cylinder circumference.

4. The rotary engine, according to claim 1, in which the first and second drive wheels are mounted for contra-rotation about a second axis of rotation, the second axis of rotation being disposed orthogonal to the first axis of rotation.

5. The rotary engine, according to claim 1, in which the first and second drive wheels are first and second gear pinions each having a plurality of circumferentially disposed teeth, each of the gear pinions are beveled towards each other.

6. The rotary engine, according to claim 5, in which the fixed drive ring has a plurality of circumferentially disposed inwardly beveled teeth, the beveled teeth of the gear pinions and the fixed drive ring being cooperable for meshing during contra-rotation of the gear pinions.

7. The rotary engine, according to claim 5, in which a first crankshaft bearing is connected to both the first crankshaft and the first gear pinion, the first crankshaft bearing being located therebetween; and a second crankshaft bearing is connected between the second crankshaft and the second gear pinion and located therebetween.

8. The rotary engine, according to claim 7, in which the first and second gear pinions are secured to the first and second crankshaft bearings and to the second arm connecting end of the first and the second connecting arms using crank gear bolts.

9. The rotary engine, according to claim 1, in which the first and second crank shafts each have a throw for connecting the crank shaft to the connecting arm, and a curvature located away from the throw.

10. The rotary engine, according to claim 1, in which a piston pin connects the first connecting ends of the connecting arms to the piston, the piston pin being disposed orthogonal to a cylinder opening first longitudinal axis.

11. The rotary engine, according to claim 1, in which the piston, the connecting arms and the crankshafts are triangulated when the piston is located in the cylinder at mid stroke so as to balance the engine.

12. The rotary engine, according to claim 1, in which an arm spacer is located between the first and second connecting arms, the spacer extending from between the connecting arms to between the first and second crankshafts.

13. The rotary engine, according to claim 1, in which a cylinder bearing is connected between the cylinder and the outer casing, the cylinder being sealingly connected to the outer casing.

14. The rotary engine, according to claim 1, in which the outer casing includes a base body and a mid section body, the base body having a base body opening, the drive shaft being sealingly connected to the base body opening.

15. The rotary engine, according to claim 14, in which drive shaft bearings are located between the drive shaft and the base body.

16. The rotary engine, according to claim 15, in which an underside of the cylinder head includes first and second seal rings circumferentially spaced apart and concentric with the ignition source port for sealingly mounting with the cylinder; and at least two seal rings are mounted in corresponding seal grooves located around the inlet port and the outlet port in the cylinder head, the seal rings being eccentrically located relative to the cylinder head.

17. The rotary engine, according to claim 16, in which a plurality of wave springs are connected to the cylinder rotary disc and the cylinder head.

18. The rotary engine, according to claim 1, further comprising:
 a cylinder head having located therein at least one inlet port, at least one outlet port, and an ignition source port; and
 a cylinder rotary disc sealingly in contact with the cylinder head and connected to an upper portion of the cylinder for rotatable movement therewith, the cylinder rotary disc being located therebetween.

19. The rotary engine, according to claim 18, in which the cylinder rotary disc includes a cylinder rotary disc opening, and a cylinder rotary disc ignition source port, the ports in the cylinder head being sequentially registered with the cylinder rotary disc opening as the cylinder rotates within the outer casing.

20. A balanced rotary engine for applying torque to a drive shaft, the rotary engine comprising:
 first and second connecting arms, each connecting arm having a first connecting end and a second connecting end, the first connecting ends being located for connection to a piston;
 first and second crankshafts, each crankshaft being rotatably connected to the second connecting end of the connecting arms;
 first and second drive wheels contra-rotatably connected to the respective first and second crankshafts; and
 a fixed drive ring being located between the first and second drive wheels and the drive shaft and having a circumferentially disposed drive member surface, the fixed drive ring being mounted in the main drive case so that the drive member surface is disposed towards the piston, the first and second drive wheels meshing with the drive ring.

* * * * *